United States Patent
Ha et al.

(10) Patent No.: US 11,245,769 B2
(45) Date of Patent: Feb. 8, 2022

(54) SERVICE-ORIENTED INTERNET OF THINGS PLATFORM AND CONTROL METHOD THEREFOR

(71) Applicant: SEOUL NATIONAL UNIVERSITY R&DB FOUNDATION, Seoul (KR)

(72) Inventors: Soon Hoi Ha, Seoul (KR); Eun Jin Jeong, Seoul (KR); Hyun Jae Lee, Hwaseong-si (KR); Dong Hyun Kang, Seoul (KR); Jang Ryul Kim, Gwacheon-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/767,588

(22) PCT Filed: Jan. 5, 2018

(86) PCT No.: PCT/KR2018/000261
§ 371 (c)(1),
(2) Date: May 27, 2020

(87) PCT Pub. No.: WO2019/112113
PCT Pub. Date: Jun. 13, 2019

(65) Prior Publication Data
US 2020/0389528 A1    Dec. 10, 2020

(30) Foreign Application Priority Data

Dec. 5, 2017    (KR) ........................ 10-2017-0165863

(51) Int. Cl.
*H04L 29/08*    (2006.01)
(52) U.S. Cl.
CPC ............ *H04L 67/16* (2013.01); *H04L 67/025* (2013.01); *H04L 67/141* (2013.01)

(58) Field of Classification Search
CPC ..... H04L 67/16; H04L 67/025; H04L 67/141; H04L 67/12; G06F 9/04
See application file for complete search history.

(56) References Cited

U.S. PATENT DOCUMENTS 9,372,922 B2 *  6/2016  Shaashua ................ G06F 16/35
10,419,486 B1 *  9/2019  Portner ................ H04W 12/37
(Continued)

FOREIGN PATENT DOCUMENTS

KR    10-2017-0037637 A    4/2017
KR    10-2017-0089146 A    8/2017

OTHER PUBLICATIONS

Middleware for Internet of Things: A Survey Mohammad Abdur Razzaque; Milojevic-Jevric, Marija; Palade, Andrei; Clarke, Siobhan. IEEE Internet of Things Journal 3.1: 70-95. Piscataway: The Institute of Electrical and Electronics Engineers, Inc. (IEEE). (Feb. 2016) (Year: 2016).*

(Continued)

*Primary Examiner* — Michael Won
(74) *Attorney, Agent, or Firm* — Revolution IP, PLLC

(57) ABSTRACT

The present invention pertains to an Internet of things platform which includes: a middleware that includes an apparatus management unit for receiving apparatus generated information from an Internet of things apparatus so as to establish a connection to the Internet of things apparatus, a service management unit for abstracting the Internet of things apparatus into a service apparatus and for controlling the Internet of things apparatus according to a service scenario, and a data management unit for generating and storing data regarding the apparatus management unit, the service management unit and the Internet of things apparatus; and a script editor that generates the service scenario for the service apparatus.

14 Claims, 14 Drawing Sheets

(56) References Cited

U.S. PATENT DOCUMENTS

| | | | |
|---|---|---|---|
| 2015/0029894 A1* | 1/2015 | Lu | H04L 12/1407 370/259 |
| 2015/0264138 A1* | 9/2015 | Watts, Jr. | H04L 67/1095 709/203 |
| 2015/0271272 A1* | 9/2015 | Mahoney | H04L 67/141 709/228 |
| 2016/0006815 A1* | 1/2016 | Dong | H04L 67/06 709/204 |
| 2016/0323143 A1* | 11/2016 | Kim | G06F 3/0629 |
| 2017/0006135 A1* | 1/2017 | Siebel | H04L 69/40 |
| 2017/0006141 A1* | 1/2017 | Bhadra | H04W 84/18 |
| 2017/0041388 A1* | 2/2017 | Tai | G06Q 10/10 |
| 2017/0134239 A1* | 5/2017 | Mahoney | H04L 41/12 |
| 2017/0201504 A1* | 7/2017 | Funk | H04L 63/0471 |
| 2017/0208139 A1* | 7/2017 | Li | H04W 4/70 |
| 2017/0255373 A1* | 9/2017 | Bruno | G06F 11/3058 |
| 2017/0257285 A1* | 9/2017 | Scholz | H04L 41/5032 |
| 2017/0289271 A1* | 10/2017 | Seed | H04L 67/141 |
| 2017/0295057 A1* | 10/2017 | Dost | H04W 4/70 |
| 2019/0028349 A1* | 1/2019 | Chen | H04L 41/0866 |
| 2019/0390547 A1* | 12/2019 | Pietrzyk | E21B 44/00 |

OTHER PUBLICATIONS

A Data Processing Middleware Based on SOA for the Internet of ThingsWang, Feng; Hu, Liang; Zhou, Jin; Kuo, Zhao. Journal of Sensors 2015 New York: Hindawi Limited. (2015) (Year: 2015).*

AUSOM: Autonomic Service-Oriented Middleware for IoT-Based SystemsBellur, Umesh; Narendra, Nanjangud C.; Mohalik, Swarup Kumar. 2017 IEEE World Congress on Services (Services): 102-5. IEEE Computer Society. (2017) (Year: 2017).*

International Search Report for PCT/KR2018/000261 dated Dec. 19, 2018 from Korean Intellectual Property Office.

Lam, An Ngoc, "SAI: A Service Oriented Autonomic IoT Platform", Halden, Norway: Master's Thesis in Computer Science, May 30, 2017, pp. 1-90.

Lee, Hyunjae et al., "SoPIoT : service-oriented platform for internet of things: work-in-progress", Seoul National University R&DB Foundation, Dept. of Computer Science and Engineering, ESWEEK 2017 Conference Presentation, ACM New York, pp. 1-3 (2017).

Lee, Hyunjae et al., "A Novel Service-Oriented Platform for the Internet of Things", Seoul National University R&DB Foundation, Dept. of Computer Science and Engineering, IoT Conference 2017 Session 6, IoT Architecture Presentation, ACM, pp. 41-48 (2017).

* cited by examiner

FIG. 20

| | | |
|---|---|---|
| Statementlist | → | Statement |
| | \| | Statementlist ; Statement |
| Statement | → | if( Conditionlist ) Statement |
| | \| | if( Conditionlist ) Statement else Statement |
| | \| | loop( LoopCondition ) Statement |
| | \| | wait until( LoopCondition ) Statement |
| | \| | SERVICE |
| LoopCondition | → | /* void */ |
| | \| | PeriodTime , Conditionlist |
| | \| | PeriodTime |
| | \| | Conditionlist |
| Conditionlist | → | Condition |
| | \| | not Condition |
| | \| | Conditionlist or Conditionlist |
| | \| | Conditionlist and Conditionlist |
| Condition | → | Expression operator Expression |
| Expression | → | SERVICE |
| | \| | N |
| | \| | R |
| | \| | STRING_LITERAL |

```
loop(1 HOUR){
A:  wait until(Camera.light < 300 and
             Camera.motion == 1);
B:  Bulb.turnOn ();
C:  if(Location.current > 1000)
D:      Camera.takePhoto ();
E:      Mail.sendMail ("Alert",
        "Motion Detected", Camera.photo);
    else
F:      Speaker.greeting ();  }
```

SERVICE-ORIENTED INTERNET OF THINGS PLATFORM AND CONTROL METHOD THEREFOR

TECHNICAL FIELD

The present invention relates to a service-oriented Internet-of-Things (IoT) platform and a control method therefor, and more particularly, to a service-oriented IoT platform that allows a user to generate a service scenario using a script editor and control a service provided by an IoT device according to the service scenario, and a control method therefor.

BACKGROUND ART

The Internet of Things (IoT), which is a technology that provides a communication function to various kinds of objects having built-in sensors and that connects the objects to the Internet, was first introduced in 1999. Recently, beyond simple connections between objects, the technology has expanded to a concept of collecting information with sensors and analyzing the information using cloud computers and artificial intelligence technology to create new values, and is expected to develop further with the development of industry 4.0.

However, most IoT-related technologies are being currently developed with a focus on hardware, and users have had a problem in that they can use only functions provided by IoT device manufacturers. Accordingly, the development of IoT technology has been demanded in terms of a software-oriented service, and solutions to how various types of smart devices and various IoT platforms can be operated in an integrated manner have been sought. As these solutions, various IoT platforms are being developed. However, the platforms have problems in that a function allowing users to program services is not provided or in that the degree of freedom for a user's IoT control is limited because a method of executing an event when a condition is satisfied (Event Condition Action (ECA)) is utilized.

DISCLOSURE

Technical Problem

Accordingly, the technical problems to be solved by the present invention are conceived in this regard, and an object of the present invention is to provide a service-oriented Internet of Things (IoT) platform capable of allowing a user to create a service scenario using a script editor and control a service provided by an IoT device according to the service scenario.

Also, another object of the present invention is to provide a method of controlling the service-oriented IoT platform capable of allowing a user to create a service scenario using a script editor and control a service provided by an IoT device according to the service scenario.

Technical Solution

According to an embodiment for achieving the objects of the present invention, an Internet of Things (IoT) platform may include a middleware unit including a device management unit configured to receive device generation information from an IoT device and establish a connection to the IoT device, a service management unit configured to abstract the IoT device into a service device and control the IoT device according to a service scenario, and a data management unit configured to generate and store data regarding the device management unit, the service management unit, and the IoT device, and a script editor configured to create the service scenario for the service device.

According to an embodiment of the present invention, the device management unit may include a device connection unit configured to receive device generation information from the IoT device and establish a connection to the IoT device, and a device monitoring unit configured to monitor a state of the IoT device, and the service management unit may include a service device generation unit configured to abstract the IoT device into the service device, a service device control unit configured to control the IoT device according to the service scenario, and a runtime service unit configured to manage a runtime for the service device control unit.

According to an embodiment of the present invention, the data management unit may include a state management unit configured to manage a state of the middleware unit, a state monitoring unit configured to collect and store state information regarding the middleware unit, the IoT device, the service device, and the service scenario, and a state transmission unit configured to transmit the state information to the script editor upon a request from the script editor, and the script editor may include a state information display unit configured to receive and display the state information.

According to an embodiment of the present invention, the service device may be service unit data reconfigured by abstracting a device identifier, device attributes, and a device function provided by the IoT device, the device identifier may include a class and a name of the IoT device, the device attributes may include a state of the IoT device, a name of a service provided by the IoT device, and a state of a service provided by the IoT device, and the device function may include non-functional characteristics and functions provided by the IoT device.

According to an embodiment of the present invention, the script editor may include a script code editor installed on an input means selected by a user and configured to support a script language, script code generated by the user using the script code editor may include one or more services of the service device or one or more different service devices, the service scenario may be created from the script code and may be sequentially performed in the written order of the script code, and the script language may include "if-else," "loop," "wait until" as control statements.

According to an embodiment of the present invention, the middleware unit may include a service scenario conversion unit configured to convert the service scenario into a service scenario graph, the service management unit may control the IoT device by mapping the service scenario graph to the IoT device and performing scheduling, and the service scenario graph may include a complex service including a finite set of service nodes, a finite set of condition nodes, a finite set of iterative nodes, and a finite set of trunk lines representing execution flows between nodes, a condition node including a blocking type, a non-blocking type, a true port, and a false port, and an iterative node including a sub-graph corresponding to a loop, an iterative period of a loop, and a condition for remaining in a loop.

According to an embodiment of the present invention, the middleware unit may include one or more middleware units, the middleware units may form a hierarchical structure, the middleware units may include one or more first layer middleware units forming a local network, and one or more second layer middleware units formed above the first layer middleware units, the middleware units may interoperate in each layer or between layers, the data management unit may manage the interoperation between the middleware units, and the middleware units may interoperate in each layer or between layers.

According to an embodiment of the present invention, the middleware unit may operate in connection with an external network or a cloud.

According to an embodiment of the present invention, the device management unit may be connected to the IoT device using the Message Queueing Telemetry Transport (MQTT) protocol, the IoT device may include a cloud, a non-restrictive device that supports the MQTT protocol, and a restrictive device that does not support the MQTT protocol, the service device may include a service provided by a cloud application, and the IoT platform may further include a gateway connected to the restrictive device to support the MQTT protocol.

According to an embodiment of the present invention, the IoT platform may include a management server connected to the middleware unit and configured to store data regarding the IoT device and a log generated in the IoT platform, the script editor may be installed on an information processing device, a mobile communication device, or an image display device, and the information processing device, the mobile communication device, or the image display device may be connected to the middleware unit in a wired or wireless manner.

According to an embodiment for achieving the objects of the present invention, a method of controlling an Internet of Things (IoT) platform may include connecting a middleware unit to an IoT device, abstracting the IoT device into a service device, generating and storing data regarding the IoT device and the service device, creating a service scenario for the service device through a script editor, and controlling the IoT device according to the service scenario.

According to an embodiment of the present invention, the connecting of a middleware unit to an IoT device may include receiving device generation information from the IoT device and establishing a connection to the IoT device, and monitoring a state of the IoT device, and the controlling of an IoT device may include a runtime service step in which a runtime for the controlling of the IoT device is managed.

According to an embodiment of the present invention, the method may further include a middleware management step in which a state of the middleware unit is managed, and a state monitoring step in which state information regarding the middleware unit, the IoT device, the service device, and the service scenario is collected and stored, and the monitoring step may further include a state transmission step in which the state information is transmitted to the script editor upon a request from the script editor, and a state information display step in which the state information is received and displayed on the script editor.

According to an embodiment of the present invention, the service device may be service unit data reconfigured by abstracting a device identifier, device attributes, and a device function provided by the IoT device, the device identifier may include a class and a name of the IoT device, the device attributes may include a state of the IoT device, a name of a service provided by the IoT device, and a state of a service provided by the IoT device, and the device function may include non-functional characteristics and functions provided by the IoT device.

According to an embodiment of the present invention, the creating of a service scenario may include allowing the script editor to be installed on an input means selected by a user, allowing a user to generate script code using a script language in the script editor, and allowing the service scenario to be generated from the script code, the script code generated by the user may include one or more services of the service device or one or more different service devices, the service scenario may be sequentially performed in the written order of the script code, and the script language may include "if-else," "loop," and "wait until" as control statements.

According to an embodiment of the present invention, the creating of a service scenario may include converting the service scenario into a service scenario graph, the controlling of the IoT device may include mapping the service scenario graph to the IoT device and performing scheduling to control the IoT device, and the service scenario graph may include a complex service including a finite set of service nodes, a finite set of condition nodes, a finite set of iterative nodes, and a finite set of trunk lines representing execution flows between nodes, a condition node including a blocking type, a non-blocking type, a true port, and a false port, and an iterative node including a sub-graph corresponding to a loop, an iterative period of a loop, and a condition for remaining in a loop.

According to an embodiment, the method may further include interoperating with one or more middleware units, the interoperating with one or more middleware units may include a first layer middleware unit generation step in which a local network is formed using the one or more middleware units, interoperating with second layer middleware units formed above the first layer middleware units, and managing the interoperation between the middleware units, and the middleware units may interoperate in each layer or between layers.

According to an embodiment of the present invention, the method may further include connecting the middleware unit to an external network or a cloud.

According to an embodiment of the present invention, the IoT device may include a cloud, a non-restrictive device that supports the Message Queueing Telemetry Transport (MQTT) protocol, and a restrictive device that does not support the MQTT protocol, the service device may include a service provided by a cloud application, and the method of controlling the IoT platform may further include a gateway connected to the restrictive device to support the MQTT protocol.

According to an embodiment of the present invention, the method may further include allowing data regarding the IoT device and a log generated in the IoT platform to be stored in a management server connected to the middleware unit, the script editor may be installed on an information processing device, a mobile communication device, or an image display device, and the information processing device, the mobile communication device, or the image display device may be connected to the middleware unit in a wired or wireless manner.

Advantageous Effects

According to embodiments of the present invention, the IoT platform and the control method therefor can allow a user to create a service scenario using a script editor and control a service provided by an IoT device according to the service scenario. Therefore, a user can actively intervene in an IoT environment to add a new service and actively reconfigure the IoT environment, and thus it is possible to increase the degree of freedom of controlling the user's IoT device, and it is also possible to allow the user to take the initiative in the IoT environment. Also, by using a script language having a simple structure, it is possible to increase control convenience for a user's IoT device.

DESCRIPTION OF DRAWINGS

FIG. 20 is a diagram showing an IoT platform and a script language for a method of controlling the IoT platform according to an embodiment of the present invention.

MODE FOR CARRYING OUT THE INVENTION

Figure 1:
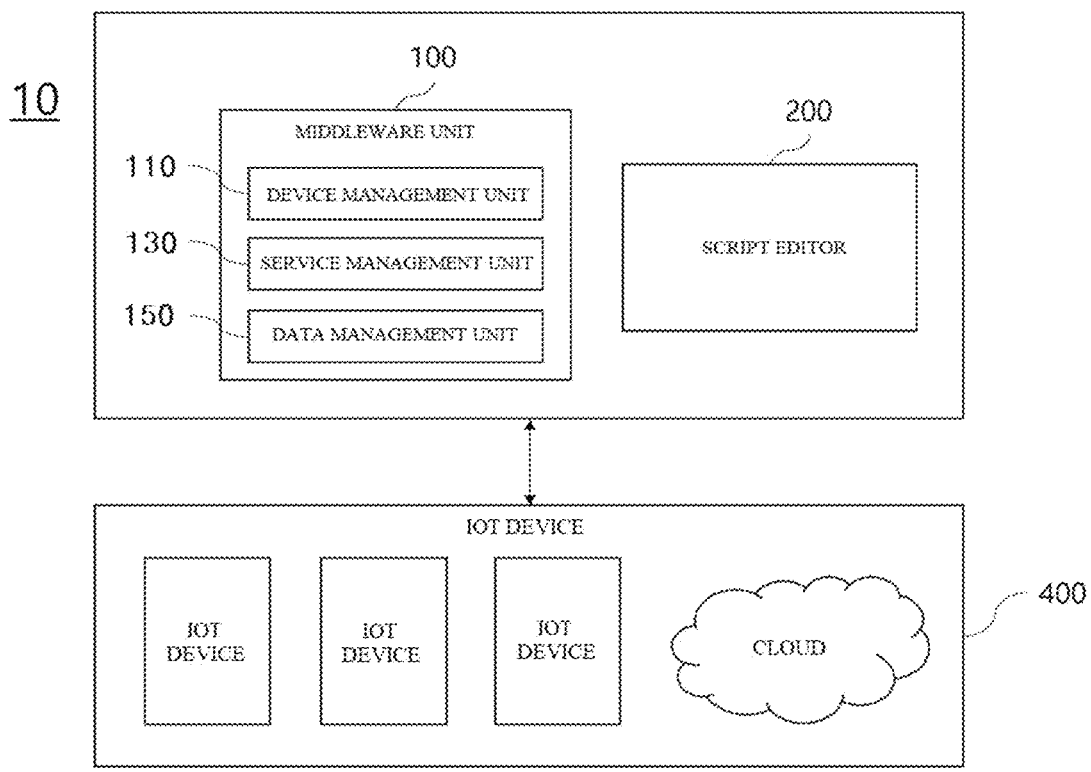
FIG. 1 is a configuration diagram showing an Internet of Things (IoT) platform according to an embodiment of the present invention.

While the invention is susceptible to various modifications and alternative forms, specific embodiments thereof will herein be described in detail. It should be understood, however, that there is no intent to limit the invention to the particular forms disclosed, but on the contrary, the invention is to cover all modifications, equivalents, and alternatives falling within the spirit and scope of the invention. In describing each drawing, like reference numerals are to be used for like elements. Terms such as first, second, and the like may be used to describe various elements, but the elements are not limited by the terms.

These terms are only used to distinguish one element from another. The terminology used herein is for the purpose of describing particular embodiments only and is not intended to be limiting of the invention. As used herein, the singular forms "a," "an," and "the" are intended to include the plural forms as well, unless the context clearly indicates otherwise.

It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in more detail with reference to the accompanying drawings.

FIG. 1 is a configuration diagram showing an Internet of Things (IoT) platform according to an embodiment of the present invention.

Referring to FIG. 1, the IoT platform according to an embodiment of the present invention includes an IoT device, a middleware unit, and a script editor.

The middleware unit 100 includes a device management unit 110, a service management unit 130, and a data management unit 150.

The device management unit 110 may receive device generation information from an IoT device 400 and may establish a connection to the IoT device 400. The method of connecting to the IoT device may be wireless communication. The method of connecting to the IoT device 400 may be wired communication, short-range wireless communication, Zigbee, or WiFi. For example, the Message Queueing Telemetry Transport (MQTT) protocol or the MQTT for Sensor Networks (MQTT-SN) protocol may be used for the connection to the IoT device 400. However, the present invention is not limited thereto, and there is no limitation on the method as long as the device management unit 110 can be connected to the IoT device 400.

The service management unit 130 may abstract the IoT device 400 into the service device and control the IoT device 400 according to the service scenario. The service management unit 130 may abstract the IoT device 400 into a service including functional or non-functional characteristics provided by the IoT device 400 to generate the service device. For example, the non-functional characteristics may be energy, a standby time, or information collected by a sensor attached to the IoT device 400. However, the present invention is not limited thereto, and all data that can be provided by the IoT device 400 may be a target of the service device. Also, the service management unit 130 may control the IoT device 400 in units of a service of the service device according to the service scenario.

The data management unit 150 may generate and store data regarding the device management unit 110, the service management unit 130, and the IoT device 400. The data may be the state of the device management unit 110, the state of the service management unit 130, the state of the IoT device 400, the state of the service device, a list of available IoT devices 400, a list of available service devices, the state of the service scenario, and backup data of the service scenario.

The script editor 200 may generate the service scenario for the service device. The script editor 200 may be installed on an input means selected by a user. The selected input means may be an information processing device, a mobile communication device, or an image display device. For example, the selected input means may be a computer, a television, a projector, a cell phone, a smartphone, a personal digital assistant (PDA), a mobile terminal, a cloud 410, an application, or a tablet. However, the present invention is not limited thereto, and there is no limitation on the device as long as the script editor 200 may be installed so that a user can enter an input. Also, the selected input means may be connected to the middleware unit 100 in a wired or wireless manner. For example, the script editor 200 may be installed on a computer. The script editor 200 may be connected to the middleware unit 100 through an external network by connection to a local area network (LAN) or WiFi or may be directly connected to the middleware unit 100 by connection to WiFi or a connecting cable.

The script editor 200 may include script code that supports a script language. The script language may consist of simple statements and thus can increase user convenience. For example, the script language may support implementation in units of a service and may include "if-else," "loop," and "wait until" as control statements. For example, "if-else" is a control statement for execution when a specific condition is satisfied, "loop" is a control statement for iterative execution when a specific condition is satisfied, and "wait until" is a control statement for waiting for execution until a specific condition is satisfied.

The script code may be code by which a user generates the service scenario using the script language. The script code may be sequentially executed in the written order of the script language. The script code may include one or more services of the service device or one or more different service devices. Thus, the script code and the service scenario may constitute a complex service in which the service device and the services of the service device are combined.

For example, by using the script code, a user may create a service scenario of turning on a lamp, taking a picture, and sending the picture by SNS and email when a motion is detected while all the lights in an office are off after 9 pm. As another example, a user may create a service scenario of automatically turning on a computer, a monitor, a projector, an air conditioner, and a TV installed in a meeting room and recording a meeting with a camera when the meeting is scheduled. As another example, a user may create a service scenario of taking a picture of a person who is entering an office with a camera, capturing the emotion of the person in the picture, playing music set according to the emotion through an audio file. As another example, a user may create a service scenario of checking a meal menu provided on a website, synthesizing a voice file based on the meal menu, and playing the voice file at lunch and dinner times through a speaker. As another example, a user may create a service scenario of sending weather information by e-mail at regular intervals when an office has no windows. As another example, a user may create a service scenario of collecting and analyzing office environment information such as the humidity, temperature, carbon dioxide concentration, brightness, and the like of an office during a certain period.

The IoT device 400 may be a device for providing a service. The IoT device 400 may include a service that is provided by a cloud 410. The IoT device 400 may include a mobile communication device and an information processing device. For example, the IoT device 400 may include an application, an e-mail, predefined information, a date, and a time which are provided by the cloud 410. However, the present invention is not limited thereto, and the IoT device 400 may include all devices capable of providing services.

The IoT device 400 may be a device that supports wired or wireless communication. For example, the IoT device 400 may support wired communication, short-range wireless communication, Zigbee, or WiFi. The IoT device 400 may support the MQTT or MQTT-SN protocol. However, the present invention is not limited thereto, and there is no limitation on the communication method provided by the IoT device 400 as long as the IoT device 400 can be connected to the middleware unit 100.

Figure 2:
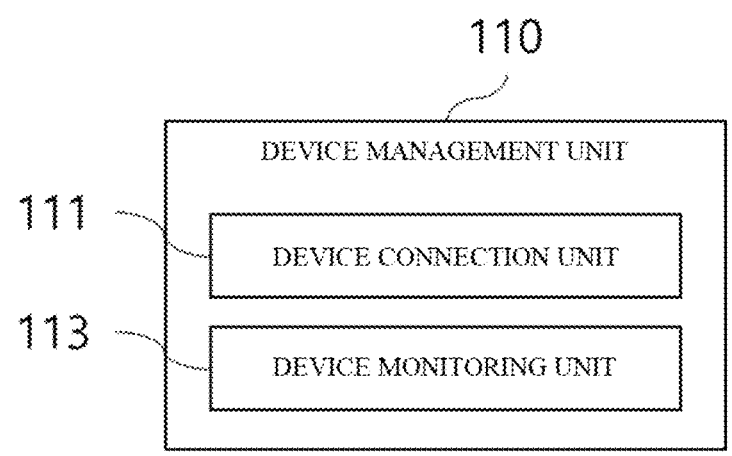
FIG. 2 is a configuration diagram showing a device management unit of an IoT platform according to an embodiment of the present invention.
Figure 3:
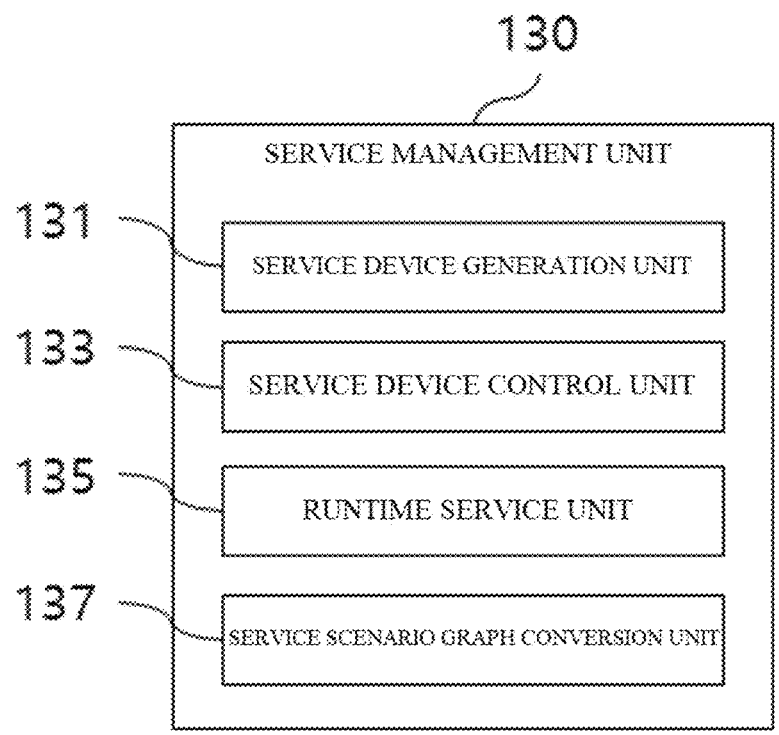
FIG. 3 is a configuration diagram showing a service management unit of an IoT platform according to an embodiment of the present invention.
Figure 4:
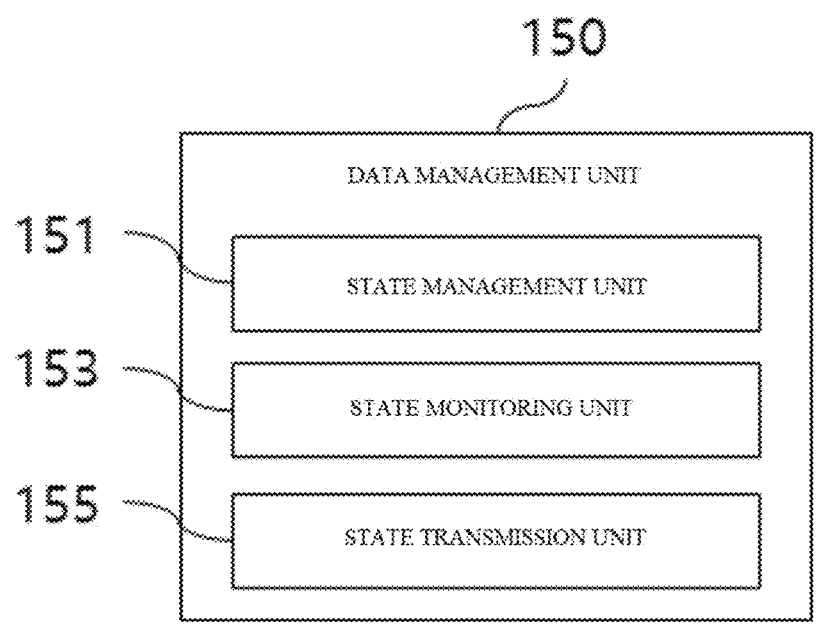
FIG. 4 is a configuration diagram showing a data management unit of an IoT platform according to an embodiment of the present invention.
Figure 5:
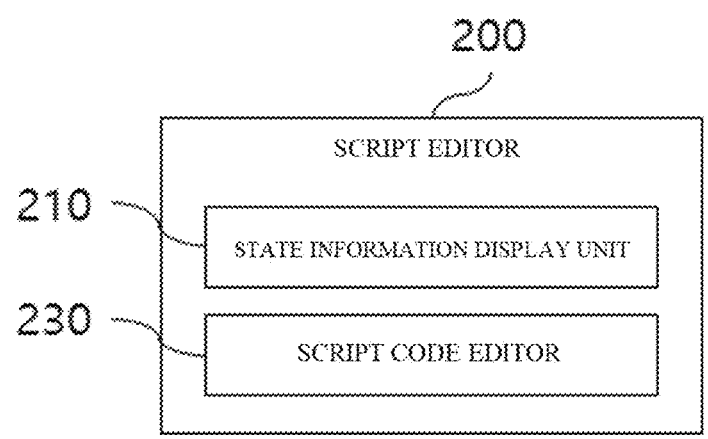
FIG. 5 is a configuration diagram showing a script editor of an IoT platform according to an embodiment of the present invention.

FIG. 2 is a configuration diagram showing a device management unit 110 of an IoT platform according to an embodiment of the present invention. FIG. 3 is a configuration diagram showing a service management unit 130 of an IoT platform according to an embodiment of the present invention. FIG. 4 is a configuration diagram showing a data management unit 150 of an IoT platform according to an embodiment of the present invention. FIG. 5 is a configuration diagram showing a script editor 200 of an IoT platform according to an embodiment of the present invention.

The IoT platform according to this embodiment is substantially the same as the IoT platform of FIG. 1 except for a device connection unit 111, a device monitoring unit 113, a service device generation unit 131, a service device control unit 133, a runtime service unit 135, a state management unit 151, a state monitoring unit 153, a state transmission unit 155, a state information display unit 210, a script code editor 230, and a service scenario graph conversion unit 137. Therefore, the same elements as those of the IoT platform of FIG. 1 are designated by the same reference numerals, and a repetitive description thereof will be omitted.

The device management unit 110 includes a device connection unit 111 and a device monitoring unit 113.

The device management unit 110 may receive device generation information from the IoT device 400 and may establish a connection to the IoT device 400. The method of connecting to the IoT device may be wireless communication. The method of connecting to the IoT device 400 may be wired communication, short-range wireless communication, Zigbee, or WiFi. For example, the MQTT or MQTT-SN protocol may be used for the connection to the IoT device 400. However, the present invention is not limited thereto, and there is no limitation on the method as long as the device connection unit 111 can be connected to the IoT device 400.

The device monitoring unit 113 may continuously monitor the state of the IoT device 400. The device monitoring unit 113 may monitor an on/off state, a normal operation state, a sensor state, a communication connection state, whether a service can be performed, a service setting state, and a service execution status with respect to the IoT device 400. However, the present invention is not limited thereto, and all data related to the operation of the IoT platform may be monitored by the monitoring unit. Data collected through the monitoring may be delivered to the script editor 200.

The service management unit 130 includes a service device generation unit 131, a service device control unit 133, and a runtime service unit 135.

The service device generation unit 131 may abstract the IoT device 400 into the service device. The service device may be service unit data obtained by abstracting and reconfiguring a device identifier, device attributes, and a device function which are provided by the IoT device 400. The device identifier may include the class and name of the IoT device 400. The device attributes may include the state of the IoT device 400, the name of a service provided by the IoT device 400, and the state of a service provided by the IoT device 400. The device function may include a service provided by the IoT device 400. The device name may be a value distinguished from those of other IoT devices and may be changed by a user or a system. Also, the device name may be a name in a form desired by a user at runtime. For example, it is assumed that a light bulb is abstracted. The class of the device identifier may be a light bulb, and the name may be a manufacturer. The device attributes may be a power on/off state, a color state, and a contrast state, and the service of the device function may be color adjustment, contrast adjustment, or power control. However, the present invention is not limited thereto, and there is no limitation on the abstracting method as long as what the IoT device 400 provides can be abstracted into a service. For example, the device name does not necessarily have to be a manufacturer and may be a device name defined by a user.

The service device control unit 133 may control the IoT device 400 according to the service scenario. The service device control unit 133 may control the IoT device 400 in units of a service of the service device according to the service scenario.

The runtime service unit 135 may manage the runtime of the service device control unit 133. The runtime service unit 135 may perform control or mediation when scenarios collide with each other or when a service scenario is stopped while the service scenario is being performed, re-executed, or newly generated by a user.

The data management unit 150 includes a state management unit 151, a state monitoring unit 153, and a state transmission unit 155.

The state management unit 151 may manage the state of the middleware unit 100. The state management unit 151 may manage the interoperation of the middleware unit 100 with a cloud 500 and the external network and the interoperation between middleware units 100. For example, the state management unit 151 may cause the middleware unit 100 to operate locally when the interoperation of the middleware unit 100 with the external network or the cloud 500 is stopped. Also, the state management unit 151 may cause the middleware units 100 to operate independently even when the interoperation between the middleware units 100 is stopped. Also, the state management unit 151 may perform mediation such that there is no collision between the middleware units 100.

The state monitoring unit 153 may collect and store state information of the middleware unit 100, the IoT device 400, the service device, and the service scenario. The state information may be the state of the device management unit 110, the state of the service management unit 130, the state of the IoT device 400, the state of the service device, the state of the middleware unit 100, the runtime state, the state of interoperation between the external network and the cloud 500, the state of interoperation between the middleware units 100, a list of available IoT devices 400, a list of available service devices, a list of available services, the state of the service scenario, or backup data of the service scenario.

The state transmission unit 155 may transmit the state information to the script editor 200 when a request is made by the script editor 200. The transmitted state information may be real-time information, pre-stored information, or information corresponding to a specific time or period selected by a user.

The script editor 200 includes a state information display unit 210 and a script code editor 230.

The state information display unit 210 of the script editor 200 may receive and display the state information. The state information may be displayed for each service, for each service device, or for each service scenario. A user may change information displayed on the state information display unit 210. A user may change the order of information displayed on the state information display unit 210. A user may search for the service, the service device, and the service scenario, and the state information display unit may display the search result.

The script editor 200 may include the script code editor 230 that supports a script language. The script language may consist of simple statements and thus can increase user convenience. For example, the script language may support implementation in units of a service and may include "if-else," "loop," and "wait until" as control statements. For example, "if-else" is a control statement for execution when a specific condition is satisfied, "loop" is a control statement for iterative execution when a specific condition is satisfied, and "wait until" is a control statement for waiting for execution until a specific condition is satisfied.

The script code editor 230 may display a value, a function, a script language, and a script code log of the script code. The script code editor 230 may allow a user to write code for creating the service scenario using the script language. The service scenario may be created from the script code. The script code may be sequentially executed in the written order of the script language. The script code may include one or more services of the service device or one or more different service devices. Thus, the script code and the service scenario may constitute a complex service in which the service device and the services of the service device are combined.

The middleware unit may include the service scenario graph conversion unit 137. The service scenario graph conversion unit 137 may convert the service scenario into a service scenario graph. The service scenario graph may be a data structure for providing complex services to the middleware unit and scheduling the services. The service scenario graph may be generated by parsing the script code written by the script editor 200. The service scenario graph may be an intermediate data structure for performing the service scenario.

The service management unit 130 may map the service scenario graph to the IoT device 400 and schedule the service scenario to control the IoT device 400. The service scenario graph may be mapped to the IoT device in units of a service. The service scenario graph may schedule the IoT device in units of a service. The service scenario graph may be created through the conversion of the entirety of the script code for each service scenario, and thus the control of the IoT device may be performed.

The service scenario graph may include a complex service, a condition node, and an iterative node.

The complex service may include a complex service including a finite set of service nodes, a finite set of condition nodes, a finite set of iterative nodes, and a finite set of trunk lines representing execution flows between nodes. The complex service G may be a tuple (S, C, L, E). S may be a finite set of service nodes, C may be a finite set of condition nodes, L may be a finite set of iterative nodes, and E may be a finite set of trunk lines representing execution flows between nodes. In the service scenario graph, the service node s∈S may be a default service that is executed by a device.

The condition node may include a blocking type, a non-blocking type, a true port, and a false port. The condition node c∈C may be defined as a tuple (type, true port, false port). The true port and the false port may be output ports for execution according to a result of the condition. The type may be a blocking type (B-type) or a non-blocking type (NB-type). A blocking type node may block the progress of the service graph until a specific condition is satisfied, and a non-blocking type node may allow the progress regardless of whether a specific condition is satisfied. For example, in the script language, "wait until" may be the blocking type, and "if-else" may be the non-blocking type.

The iterative node may include a sub-graph corresponding to a loop, an iterative period of a loop, and a condition for remaining in a loop. The iterative node may be a tuple (SG, iterative period, designated condition). The iterative period may be the iterative period of the loop, and the designated condition may be a condition for remaining in the loop. When the condition is not satisfied, the loop may end. SG may indicate a sub-graph. This may be a graph corresponding to the loop. The iterative period and the designated condition may be omitted. The absence of both the iterative period and the designated condition may indicate an unlimited loop. The presence of only the iterative period may indicate that an unlimited loop is periodically executed, and the presence of only the designated condition may indicate that a loop is executed while the condition is satisfied.

However, the present invention is not limited thereto, and there is no limitation on the method of representing the complex service, the condition node, and the iterative node, the data type, and the data structure type as long as the complex service, the condition node, and the iterative node can be represented. For example, the tuple may be a list.

Figure 6:
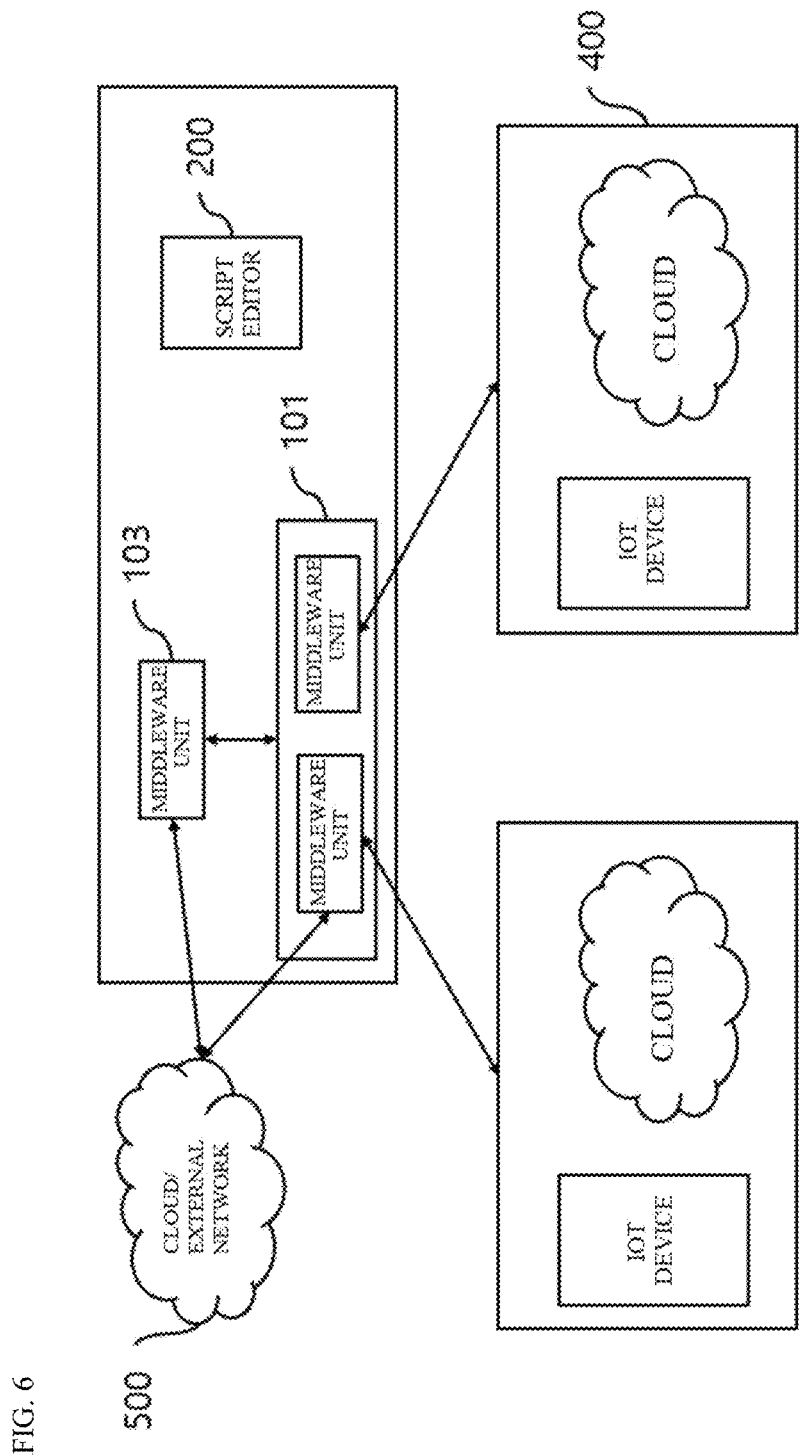
FIG. 6 is a configuration diagram showing a first layer middleware unit and a second layer middleware unit of an IoT platform according to an embodiment of the present invention.

FIG. 6 is a configuration diagram showing a first layer middleware unit 101 and a second layer middleware unit 103 of an IoT platform according to an embodiment of the present invention.

The IoT platform according to this embodiment is substantially the same as the IoT platform of FIGS. 1 to 5 except for the first layer middleware unit 101 and the second layer middleware unit 103. Therefore, the same elements as those of the IoT platform of FIGS. 1 to 5 are designated by the same reference numerals, and a repetitive description thereof will be omitted.

The middleware unit 100 may include one or more middleware units, and the middleware units 100 may form a hierarchical structure. The middleware units 100 may interoperate in each layer or between layers.

The middleware unit 100 may be first layer middleware units 101 and a second layer middleware unit 103. The first layer middleware units 101 may constitute a local network. The first layer middleware units 101 may be connected to different IoT devices 400. For example, one middleware unit 100 may be connected to a set of IoT devices 400, and another middleware unit 100 may be connected to a set of IoT devices 400 different from the set of IoT devices 400.

The second layer middleware unit 103 may be formed above the first layer middleware units 101. For example, the middleware units 100 may be connected to one another by stacking the second layer middleware unit 103 over the first layer middleware units 101. Each of the middleware units 100 may be connected to the external network or the cloud 500. Alternatively, the external network or the cloud 500 may be connected to one middleware unit 100, and another middleware unit 100 may be connected to the external network and the cloud 500 using the connected middleware unit 100 as a bridge. For example, the first layer middleware units 101 may be connected to the external network and the cloud 500 through the second layer middleware unit 103 instead of being directly connected to the external network. Accordingly, the first layer middleware units 101 may constitute a local network and may be secured.

The hierarchical structure of the middleware unit may be expanded. For example, the hierarchical structure may include first layer middleware units for each office, second layer middleware units for each building including offices, third layer middleware units for each region including buildings, and fourth layer middleware units for each province including regions. A middleware unit in an upper layer may control or manage a middleware in a lower layer. The IoT device may be connected to a first layer middleware unit, and upper middleware units may configure devices connected to first layer middleware units different from each other as a complex service.

The data management unit 150 may manage the state of the middleware unit 100. The data management unit 150 may manage the interoperation of the middleware unit 100 with the cloud 500 and the external network and the interoperation between the middleware units 100. For example, the data management unit 150 may cause the middleware unit 100 to operate locally when the interoperation of the middleware unit 100 with the external network or the cloud 500 is stopped. Also, the data management unit 150 may cause the middleware units 100 to operate independently even when the interoperation between the middleware units 100 is stopped. Also, the data management unit 150 may perform mediation such that there is no collision between the middleware units 100. Accordingly, the middleware units 100 may stably operate locally and independently even when a connection between the middleware unit 100 and the external network or the cloud 500 is lost.

Figure 7:
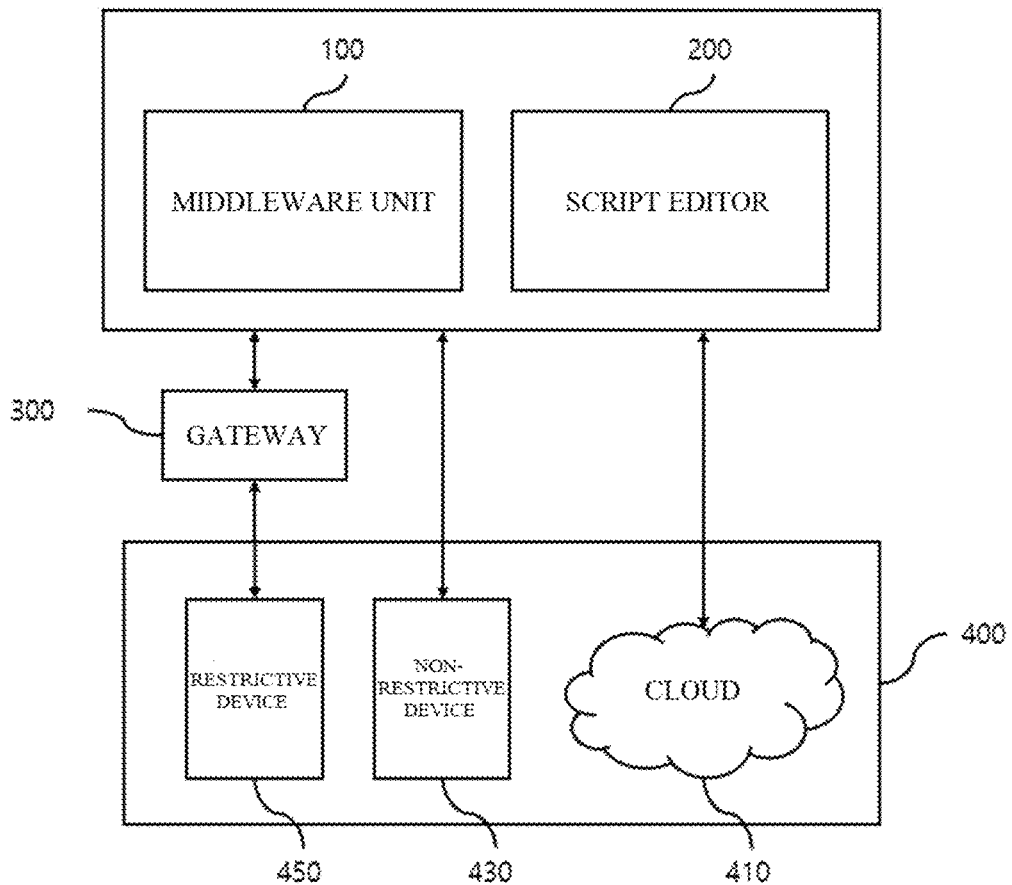
FIG. 7 is a configuration diagram showing a gateway of an IoT platform according to an embodiment of the present invention.
Figure 16:
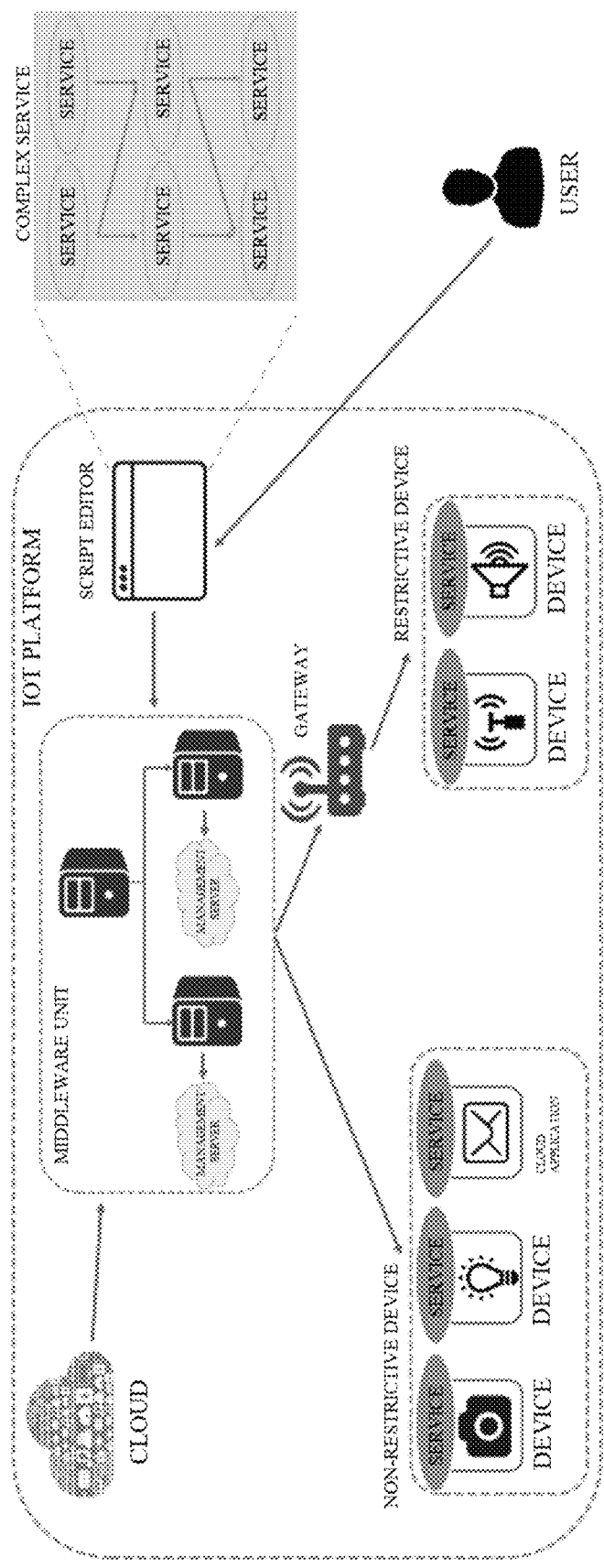
FIG. 16 is a configuration diagram showing an IoT platform according to an embodiment of the present invention.

FIG. 7 is a configuration diagram showing a gateway 300 of an IoT platform according to an embodiment of the present invention. FIG. 16 is a configuration diagram showing an IoT platform according to an embodiment of the present invention.

The IoT platform according to this embodiment is substantially the same as the IoT platform of FIGS. 1 to 5 except for the cloud 410, the non-restrictive device 430, the restrictive device 450, the gateway 300, and the management server. Therefore, the same elements as those of the IoT platform of FIGS. 1 to 5 are designated by the same reference numerals, and a repetitive description thereof will be omitted.

The device management unit 110 may be connected to the IoT device 400 using the MQTT protocol. However, the present invention is not limited thereto, and there is no limitation on the type and kind of a support protocol of the device management unit 110 when the protocol is capable of connection to the IoT device 400.

The IoT device 400 may include the cloud 410, the non-restrictive device 430, and the restrictive device 450.

The cloud 410 may be a service provided by the cloud 410. For example, the IoT device 400 may include an application, an e-mail, predefined information, a date, and a time which are provided by the cloud 410.

The non-restrictive device 430 may be a device that supports the MQTT protocol. Accordingly, the non-restrictive device 430 may be connected to the middleware unit 100 that supports the MQTT protocol. The non-restrictive device 430 may be a device capable of connecting WiFi.

The restrictive device 450 may be a device that does not support the MQTT protocol. The restrictive device 450 may be a device that cannot connect to a restrictive resource through WiFi. Accordingly, the restrictive device 450 may be connected to the middleware unit 100 through the gateway 300.

The gateway 300 may connect the restrictive device 450 to the middleware unit 100. The gateway 300 may support short-range wired communication, short-range wireless communication, Zigbee, or WiFi. For example, the restrictive device 450 may be connected to the gateway 300 using the MQTT-SN protocol and through a Zigbee connection, and the gateway 300 may convert the restrictive device 450 to the MQTT protocol and connect the restrictive device 450 to the middleware unit 100.

The management server may be connected to the middleware unit, and data regarding the IoT device and a log generated in the IoT platform may be stored in the management server. The middleware unit and the management server may be connected to each other over a network. The middleware unit may transmit, to the management server, data information generated in the IoT device and log data associated with the IoT platform. The management server may receive and store the data information and the log data. The data stored in the management server may be displayed through a separate display unit or a web interface. The data stored in the management server may be displayed in the form of a text, a graph, a photo, or a video.

The information stored in the management server may be utilized as big data. By utilizing the big data, the middleware unit may analyze a usage pattern of an IoT device or may extract statistics of various kinds of information including power information, sensor data information, email transmission information or the like of the IoT device. For example, through an analysis of data collected from the big data, the middleware unit may discover a pattern in which the degree of lighting brightness in an office is affected by outside weather and corridor light. The big data may be combined with data mining technology and deep-learning technology to generate a recommended service scenario or an automatic service scenario from the analyzed information or from information obtained by analyzing a user-specific propensity and control pattern of the service scenario.

The management server may include functions of a logging server. The management server may store any kind of log generated in the system. The logs may be utilized for problem analysis, solution derivation, and problem prediction.

Figure 8:
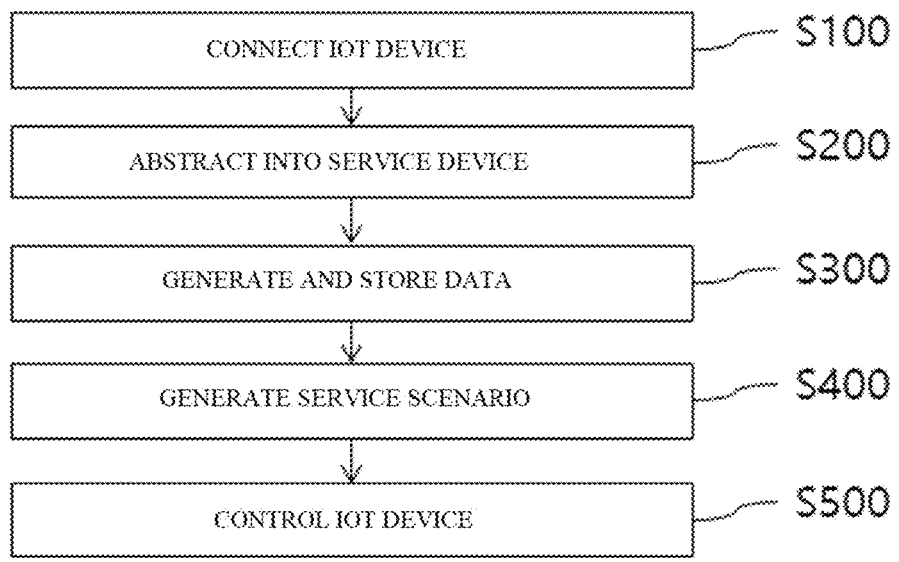
FIG. 8 is a flowchart illustrating a method of controlling an IoT platform according to an embodiment of the present invention.

FIG. 8 is a flowchart illustrating a method of controlling an IoT platform according to an embodiment of the present invention.

Referring to FIG. 8, the method of controlling an IoT platform according to an embodiment of the present invention includes connecting to an IoT device (S100), abstracting the IoT device into a service device (S200), generating and storing data (S300), generating a service scenario (S400), and controlling the IoT device (S500).

In the step of connecting to an IoT device (S100), a middleware unit may be connected to the IoT device. The middleware unit may receive device generation information from the IoT device and establish a connection to the IoT device. The method of connecting to the IoT device may be wireless communication. The method of connecting to the IoT device may be wired communication, short-range wireless communication, Zigbee, or WiFi. For example, the MQTT or MQTT-SN protocol may be used for the connection to the IoT device. However, the present invention is not limited thereto, and there is no limitation on the method as long as the middleware unit can be connected to the IoT device.

In the step of abstracting the IoT device into a service device (S200), the IoT device may be abstracted into a service device. The IoT device may be abstracted into a service including non-functional characteristics or functions provided by the IoT device to generate the service device. For example, the non-functional characteristics may be energy, a standby time, or information collected by a sensor attached to the IoT device. However, the present invention is not limited thereto, and all data that can be provided by the IoT device may be a target of the service device.

In the service device generation step, the IoT device may be abstracted into the service device. The service device may be service unit data obtained by abstracting and reconfiguring a device identifier, device attributes, and a device function which are provided by the IoT device 400. The device identifier may include the class and name of the IoT device. The device attributes may include the state of the IoT device, the name of a service provided by the IoT device, and the state of a service provided by the IoT device. The device function may include a service provided by the IoT device. The device name may be a value distinguished from those of other IoT devices and may be changed by a user or a system. Also, the device name may be a name in a form desired by a user at runtime. For example, it is assumed that a light bulb is abstracted. The class of the device identifier may be a light bulb, and the name may be a manufacturer. The device attributes may be a power on/off state, a color state, and a contrast state, and the service of the device function may be color adjustment, contrast adjustment, or power control. However, the present invention is not limited thereto, and there is no limitation on the abstracting method as long as what the IoT device provides can be abstracted into a service. For example, the device name does not necessarily have to be a manufacturer and may be a device name defined by a user.

In the step of generating and storing data (S300), data regarding the middleware unit, the IoT device, and the service device may be generated and stored. The data may be the state of the middleware unit, the state of the IoT device, the state of the service device, a list of available IoT devices, a list of available service devices, the state of the service scenario, and backup data of the service scenario.

In the step of generating a service scenario (S400), a script editor may generate a service scenario for the service device. The script editor may generate the service scenario for the service device. The script editor may be installed on an input means selected by a user. The selected input means may be an information processing device, a mobile communication device, or an image display device. For example, the selected input means may be a computer, a television, a projector, a cell phone, a smartphone, a PDA, a mobile terminal, a cloud, an application, or a tablet. However, the present invention is not limited thereto, and there is no limitation on the device as long as the script editor may be installed so that a user can enter an input. Also, the selected input means may be connected to the middleware unit in a wired or wireless manner. For example, the script editor may be installed on a computer. The script editor may be connected to the middleware unit through an external network by connection to a LAN or WiFi or may be directly connected to the middleware unit by connection to WiFi or a connecting cable.

The script editor may include script code that supports a script language. The script language may consist of simple statements and thus can increase user convenience. For example, the script language may support implementation in units of a service and may include "if-else," "loop," and "wait until" as control statements. For example, "if-else" is a control statement for execution when a specific condition is satisfied, "loop" is a control statement for iterative execution when a specific condition is satisfied, and "wait until" is a control statement for waiting for execution until a specific condition is satisfied.

The script code may be code by which a user generates the service scenario using the script language. The script code may be sequentially executed in the written order of the script language. The script code may include one or more services of the service device or one or more different service devices. Thus, the script code and the service scenario may constitute a complex service in which the service device and the services of the service device are combined.

For example, by using the script code, a user may create a service scenario of turning on a lamp, taking a picture, and sending the picture by SNS and email when a motion is detected while all the lights in an office are off after 9 pm. As another example, a user may create a service scenario of automatically turning on a computer, a monitor, a projector, an air conditioner, and a TV installed in a meeting room and recording a meeting with a camera when the meeting is scheduled. As another example, a user may create a service scenario of taking a picture of a person who is entering an office with a camera, capturing the emotion of the person in the picture, playing music set according to the emotion through an audio file. As another example, a user may create a service scenario of checking a meal menu provided on a website, synthesizing a voice file based on the meal menu, and playing the voice file at lunch and dinner times through a speaker. As another example, a user may create a service scenario of sending weather information by e-mail at regular intervals when an office has no windows. As another example, a user may create a service scenario of collecting and analyzing office environment information such as the humidity, temperature, carbon dioxide concentration, brightness, and the like of an office during a certain period.

In the step of controlling the IoT device (S500), the IoT device may be controlled in units of a service of the service device according to the service scenario.

The IoT device 400 may be a device for providing a service. The IoT device may include a service that is provided by a cloud 410. The IoT device may include a mobile communication device and an information processing device. For example, the IoT device may include an application, an e-mail, predefined information, a date, and a time which are provided by a cloud 410. However, the present invention is not limited thereto, and the IoT device may include all devices capable of providing services.

The IoT device may be a device that supports wired or wireless communication. For example, the IoT device may support wired communication, short-range wireless communication, Zigbee, or WiFi. The IoT device may support the MQTT or MQTT-SN protocol. However, the present invention is not limited thereto, and there is no limitation on the communication method supported by the IoT device as long as the IoT device can be connected to the middleware unit.

Figure 9:
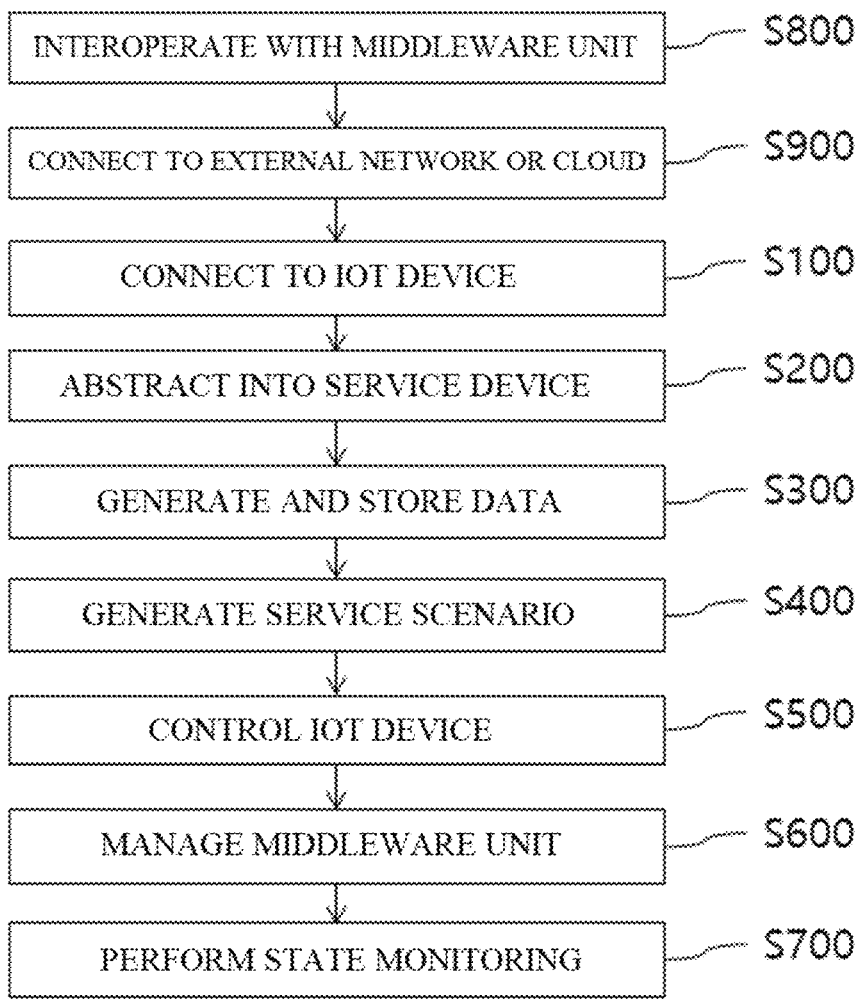
FIG. 9 is a flowchart illustrating a method of controlling an IoT platform according to an embodiment of the present invention.
Figure 10:
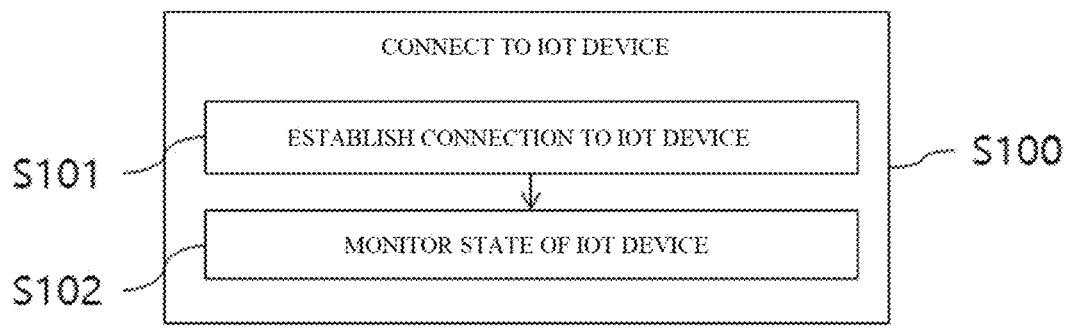
FIG. 10 is a flowchart illustrating a step of connecting to an IoT device in a method of controlling an IoT platform according to an embodiment of the present invention.
Figure 11:
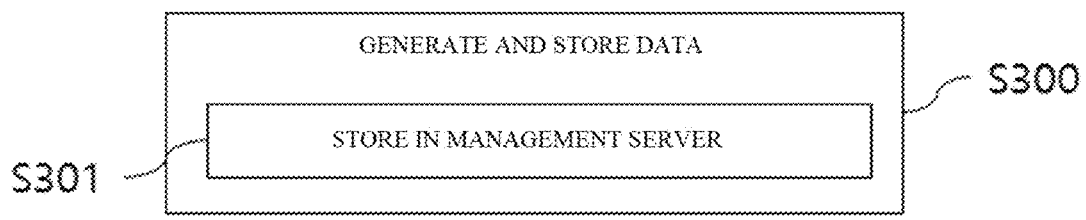
FIG. 11 is a flowchart illustrating a step of generating and storing data in a method of controlling an IoT platform according to an embodiment of the present invention.
Figure 12:
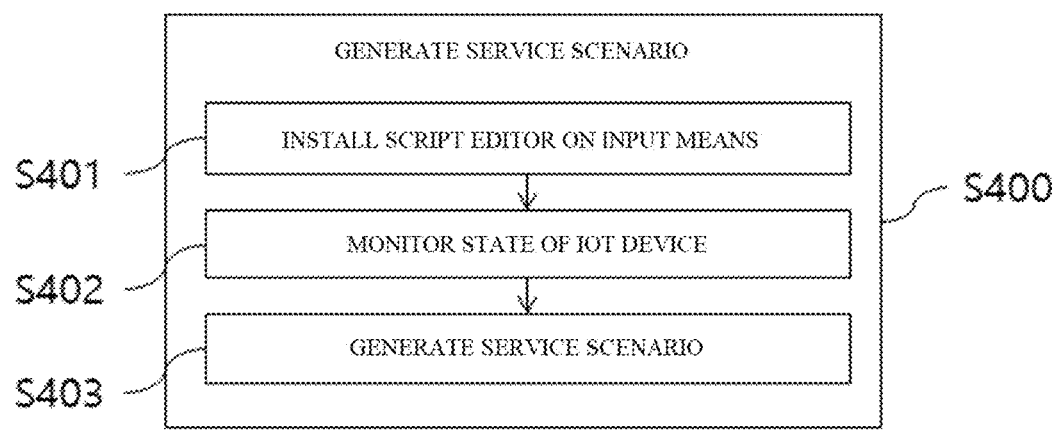
FIG. 12 is a flowchart illustrating a step of generating a service scenario in a method of controlling an IoT platform according to an embodiment of the present invention.
Figure 13:
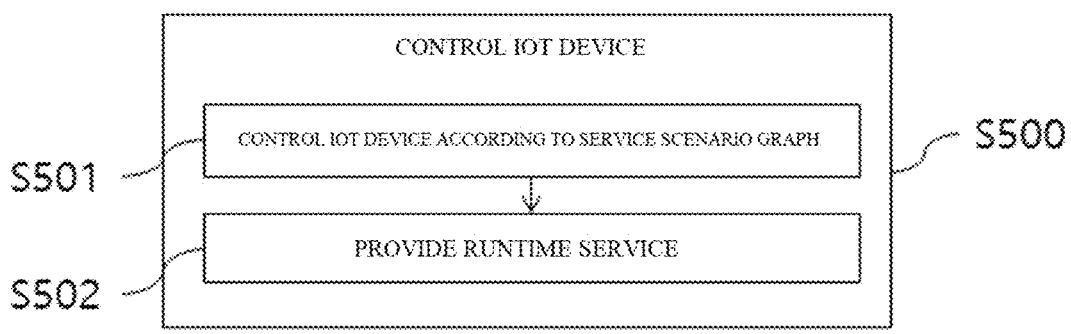
FIG. 13 is a flowchart illustrating a step of controlling an IoT device in a method of controlling an IoT platform according to an embodiment of the present invention.
Figure 14:
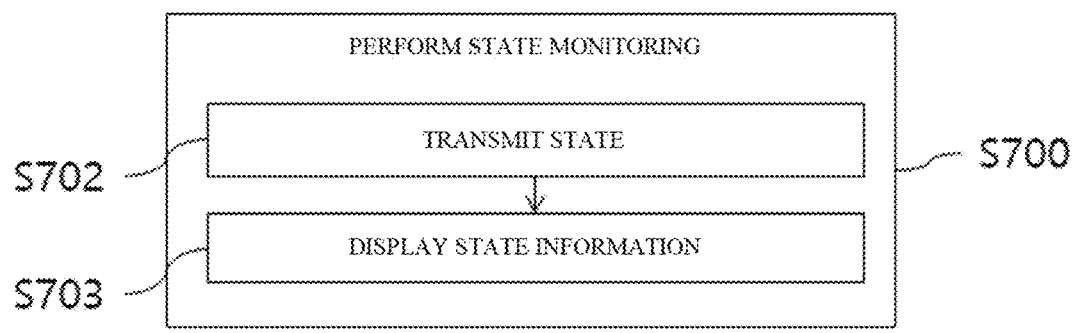
FIG. 14 is a flowchart illustrating a step of performing state monitoring in a method of controlling an IoT platform according to an embodiment of the present invention.
Figure 15:
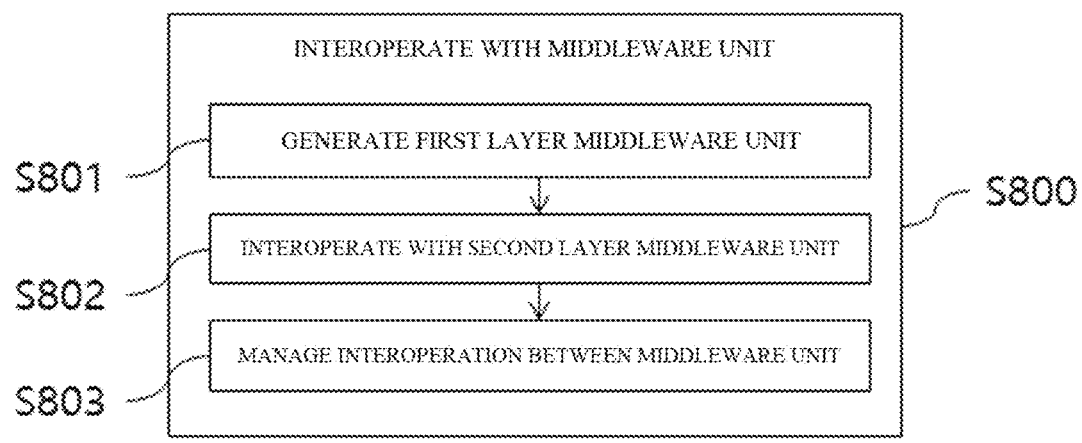
FIG. 15 is a flowchart illustrating a step of interoperating with a middleware unit in a method of controlling an IoT platform according to an embodiment of the present invention.

FIG. 9 is a flowchart illustrating a method of controlling an IoT platform according to an embodiment of the present invention. FIG. 10 is a flowchart illustrating the step of connecting to an IoT device (S100) in the method of controlling an IoT platform according to an embodiment of the present invention. FIG. 11 is a flowchart illustrating the step of generating and storing data (S300) in the method of controlling an IoT platform according to an embodiment of the present invention. FIG. 12 is a flowchart illustrating the step of generating a service scenario (S400) in the method of controlling an IoT platform according to an embodiment of the present invention. FIG. 13 is a flowchart illustrating the step of controlling an IoT device (S500) in the method of controlling an IoT platform according to an embodiment of the present invention. FIG. 14 is a flowchart illustrating the step of performing state monitoring (S700) in the method of controlling an IoT platform according to an embodiment of the present invention. FIG. 15 is a flowchart illustrating the step of interoperating with a middleware unit (S800) in the method of controlling an IoT platform according to an embodiment of the present invention.

The method of controlling an IoT platform according to this embodiment is substantially the same as the IoT platform control method of FIG. 8 except for a step of establishing a connection to the IoT device (S101), a step of monitoring the state of the IoT device (S102), a runtime service step (S503), a middleware unit management step (S600), a state monitoring step (S700), a state transmission step (S702), a state information display step (S703), a step of performing storage in a management server (S301), a step of installation on an input means (401), a step of generating script code (S402), a step of creating a service scenario (S403), a step of conversion into a service scenario graph (S404), a step of controlling the IoT device according to the service scenario graph (S501), a step of interoperating with a middleware unit (S800), and a step of connection to an external network or a cloud 500 (S900). Therefore, the same elements as those of the IoT platform control method of FIG. 8 are designated by the same reference numerals, and a repetitive description thereof will be omitted.

A step of connecting to an IoT device (S100) may include establishing a connection to an IoT device (S101) and monitoring the state of the IoT device (S102).

In the step of establishing a connection to the IoT device (S101), device generation information may be received from the IoT device, and a connection to the IoT device may be established. The method of connecting to the IoT device may be wireless communication. The method of connecting to the IoT device may be wired communication, short-range wireless communication, Zigbee, or WiFi. For example, the MQTT or MQTT-SN protocol may be used for the connection to the IoT device. However, the present invention is not limited thereto, and there is no limitation on the method as long as the middleware unit can be connected to the IoT device.

In the step of monitoring the state of the IoT device (S102), the state of the IoT device may be continuously monitored. An on/off state, a normal operation state, a sensor state, a communication connection state, whether a service can be performed, a service setting state, and a service execution status with respect to the IoT device 400 may be monitored. However, the present invention is not limited thereto, and all data related to the operation of the IoT device and the middleware unit may be monitored by the monitoring unit. Data collected through the monitoring may be delivered to the script editor.

The step of controlling the IoT device (S500) may include the runtime service step (S503).

In the runtime service step (S503), a runtime for the step of controlling the IoT device (S500) may be managed. In the runtime service step (S503), control or mediation may be performed when scenarios collide with each other or when a service scenario is stopped while the service scenario is being performed, re-executed, or newly generated by a user.

The method of controlling the IoT platform may include the middleware unit management step (S600) and the state monitoring step (S700).

In the middleware unit management step (S600), the interoperation of the middleware unit with the external network and the cloud 500 and the interoperation between the middleware units may be managed. For example, the middleware unit may be caused to operate locally when the interoperation of the middleware unit with the external network or the cloud 500 is stopped. Also, the middleware units may be caused to operate independently even when the interoperation between the middleware units is stopped. Also, mediation may be performed such that there is no collision between the middleware units.

In the state monitoring step (S700), state information of the middleware unit, the IoT device, the service device, and the service scenario may be collected and stored. The state information may be the state of the IoT device, the state of the service device, the state of the middleware unit, the runtime state, the state of interoperation with the external network and the cloud 500, the state of interoperation between the middleware units, a list of available IoT devices, a list of available service devices, a list of available services, the state of the service scenario, and backup data of the service scenario.

The monitoring step may include the state transmission step and the state information display step.

In the state transmission step (S702), the state information may be transmitted to the script editor upon a request from the script editor. The transmitted state information may be real-time information, pre-stored information, or information corresponding to a specific time or period selected by a user.

In the state information display step (S703), the state information may be received and displayed on the script editor. The state information may be displayed for each service, for each service device, or for each service scenario. A user may change the displayed state information. A user may change the order of the displayed state information. A user may search for the service, the service device, and the service scenario, and the script editor may display the search result.

In the step of performing storage in a management server (S301), data regarding the IoT device and a log generated in the IoT platform may be stored in a management server connected to the middleware unit. The middleware unit and the management server may be connected to each other over a network. The middleware unit may transmit, to the management server, data information generated in the IoT device and log data associated with the IoT platform. The management server may store the data information and the log data. The data stored in the management server may be displayed through a separate display unit or a web interface. The data stored in the management server may be displayed in the form of a text, a graph, a photo, or a video.

The information stored in the management server may be utilized as big data. The big data may be utilized to analyze a usage pattern of an IoT device or extract statistics of various kinds of information including power information, sensor data information, email transmission information or the like of the IoT device. For example, through the analysis of the big data, a pattern in which the degree of lighting brightness in an office is affected by outside weather and corridor light may be found. In combination with data mining technology and deep-learning technology, the big data may generate a recommended service scenario or an automatic service scenario from the analyzed information or from information obtained by analyzing a user-specific propensity and control pattern of the service scenario. The big data may be utilized to analyze and solve a system problem of the IoT platform. The big data may be utilized to analyze the same or similar kinds of problems and solutions for the IoT platform and extract relevant statistics. Also, in combination with data mining technology and deep-learning technology, the big data may be used to learn a method for solving an occurring problem using the analyzed information and automatically apply the solution when the same problem occurs to solve the problem.

The management server may include functions of a logging server. The management server may store any kind of log generated in the system. The logs may be utilized for problem analysis, solution derivation, and problem prediction.

The step of creating the service scenario (S400) may include the step of installation on an input means (S401), the step of generating script code (S402), the step of creating the service scenario (S403), and the step of conversion into a service scenario graph.

In the step of installation on an input means (S401), the script editor may be installed on an input means selected by a user. The selected input means may be an information processing device, a mobile communication device, or an image display device. For example, the selected input means may be a computer, a television, a projector, a cell phone, a smartphone, a PDA, a mobile terminal, a cloud, an application, or a tablet. However, the present invention is not limited thereto, and there is no limitation on the device as long as the script editor may be installed so that a user can enter an input. Also, the selected input means may be connected to the middleware unit in a wired or wireless manner. For example, the script editor may be installed on a computer. The script editor may be connected to the middleware unit through the external network by connection to a LAN or WiFi or may be directly connected to the middleware unit by connection to WiFi or a connecting cable.

In the step of generating script code (S402), a user may generate script code using a script language using the script editor. The script language may consist of simple statements and thus can increase user convenience. For example, the script language may support implementation in units of a service and may include "if-else," "loop," and "wait until"

as control statements. For example, "if-else" is a control statement for execution when a specific condition is satisfied, "loop" is a control statement for iterative execution when a specific condition is satisfied, and "wait until" is a control statement for waiting for execution until a specific condition is satisfied.

In the step of creating the service scenario (S403), a value, a function, a script language, and a script code log of the script code may be displayed using the script code. A script code editor may allow a user to write code for creating the service scenario using the script language. The service scenario may be created from the script code. The script code may be sequentially executed in the written order of the script language. The script code may include one or more services of the service device or one or more different service devices. Thus, the script code and the service scenario may constitute a complex service in which the service device and the services of the service device are combined.

In the step of conversion into a service scenario graph (S404), the service scenario may be converted into a service scenario graph. The service scenario graph may be a data structure for providing complex services to the middleware unit and scheduling the services. The service scenario graph may be generated by parsing the script code and the service scenario written by the script editor or by combining such script code. The service scenario graph may be an intermediate data structure for performing the service scenario.

In the step of controlling the IoT device (S500), the IoT device may be controlled by mapping the service scenario graph to the IoT device and performing scheduling. The service scenario graph may be mapped to the IoT device in units of a service. The service scenario graph may schedule the IoT device in units of a service. The service scenario graph may be created through the conversion of the entirety of the script code for each service scenario, and thus the control of the IoT device may be performed.

The service scenario graph may include a complex service, a condition node, and an iterative node.

The complex service may include a complex service including a finite set of service nodes, a finite set of condition nodes, a finite set of iterative nodes, and a finite set of trunk lines representing execution flows between nodes. The complex service G may be a tuple (S, C, L, E). S may be a finite set of service nodes, C may be a finite set of condition nodes, L may be a finite set of iterative nodes, and E may be a finite set of trunk lines representing execution flows between nodes. In the service scenario graph, the service node s∈S may be a default service that is executed by a device.

The condition node may include a blocking type, a non-blocking type, a true port, and a false port. The condition node c EC may be defined as a tuple (type, true port, false port). The true port and the false port may be output ports for execution according to a result of the condition. The type may be a blocking type (B-type) or a non-blocking type (NB-type). A blocking type node may block the progress of the service graph until a specific condition is satisfied, and a non-blocking type node may allow the progress regardless of whether a specific condition is satisfied. For example, in the script language, "wait until" may be the blocking type, and "if-else" may be the non-blocking type.

The iterative node may include a sub-graph corresponding to a loop, an iterative period of a loop, and a condition for remaining in a loop. The iterative node may be a tuple (SG, iterative period, designated condition). The iterative period may be the iterative period of the loop, and the designated condition may be a condition for remaining in the loop. When the condition is not satisfied, the loop may end. SG may indicate a sub-graph. This may be a graph corresponding to the loop. The iterative period and the designated condition may be omitted. The absence of both the iterative period and the designated condition may indicate an unlimited loop. The presence of only the iterative period may indicate that an unlimited loop is periodically executed, and the presence of only the designated condition may indicate that a loop is executed while the condition is satisfied.

However, the present invention is not limited thereto, and there is no limitation on the method of representing the complex service, the condition node, and the iterative node, the data type, and the data structure type as long as the complex service, the condition node, and the iterative node can be represented. For example, the tuple may be a list.

In the step of controlling the IoT device (S500), the IoT device may be controlled according to the service scenario graph.

The method of controlling the IoT platform may include the step of interoperating with the middleware unit (S800) and the step of connecting to the external network or the cloud 500 (S900).

The step of interoperating with the middleware unit (S800) may include a step of generating a first layer middleware unit including one or more middleware units constituting a local network (S801) and a step of interoperating with a second layer middleware unit formed over the first layer middleware unit (S802).

The middleware unit may include one or more middleware units, and the middleware units may form a hierarchical structure. The middleware units may interoperate in each layer or between layers.

The middleware units may be first layer middleware units and second layer middleware units. The first layer middleware units may constitute a local network. The first layer middleware units may be connected to different IoT devices. For example, one middleware unit may be connected to a set of IoT devices, and another middleware unit may be connected to a set of IoT devices different from the set of IoT devices.

The second layer middleware units may be formed above the first layer middleware units. For example, the middleware units may be connected to one another by stacking the second layer middleware unit over the first layer middleware unit. Each of the middleware units may be connected to the external network or the cloud 500. Alternatively, the external network or the cloud 500 may be connected to one middleware unit, and another middleware unit may be connected to the external network and the cloud 500 using the connected middleware unit 100 as a bridge. For example, the first layer middleware units may be connected to the external network and the cloud 500 through the second layer middleware units instead of being directly connected to the external network. Accordingly, the first layer middleware units may constitute a local network and may be secured.

The hierarchical structure of the middleware unit may be expanded. For example, the hierarchical structure may include first layer middleware units for each office, second layer middleware units for each building including offices, third layer middleware units for each region including buildings, and fourth layer middleware units for each province including regions. A middleware unit in an upper layer may control or manage a middleware in a lower layer. The IoT device may be connected to a first layer middleware unit, and upper middleware units may configure devices connected to first layer middleware units different from each other as a complex service.

The method of controlling the IoT platform may include the step of managing interoperation between the middleware units (S803). In the step of managing interoperation between the middleware units (S803), the interoperation of the middleware unit with the external network and the cloud 500 and the interoperation between the middleware units may be managed. For example, the middleware unit may be caused to operate locally when the interoperation of the middleware unit with the external network or the cloud 500 is stopped. Also, the middleware units may be caused to operate independently even when the interoperation between the middleware units is stopped. Also, mediation may be performed such that there is no collision between the middleware units. Accordingly, the middleware units may stably operate locally and independently even when a connection between the middleware unit 100 and the external network or the cloud 500 is lost.

In the step of connecting to the external network or the cloud 500 (S900), the middleware units may be connected to the external network or the cloud 500. Each of the middleware units may be connected to the external network or the cloud 500. Alternatively, the external network or the cloud 500 may be connected to one middleware unit, and another middleware unit may be connected to the external network and the cloud 500 using the connected middleware unit 100 as a bridge.

Figure 17:
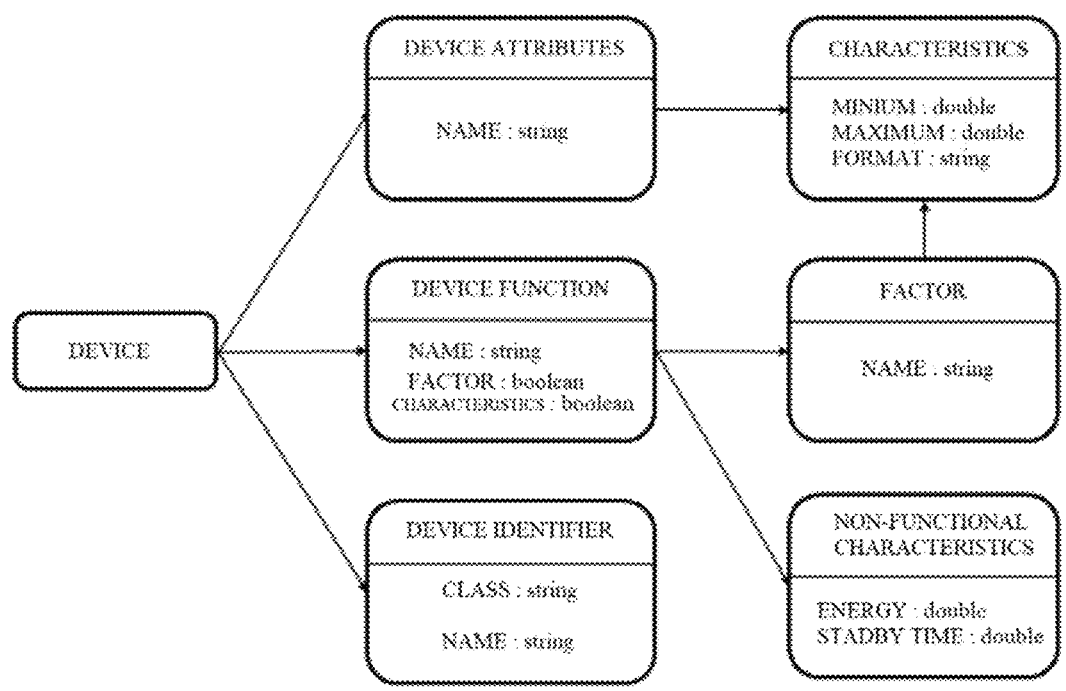
FIG. 17 is a configuration diagram showing an IoT platform and a service device for a method of controlling the IoT platform according to an embodiment of the present invention.
Figure 18:
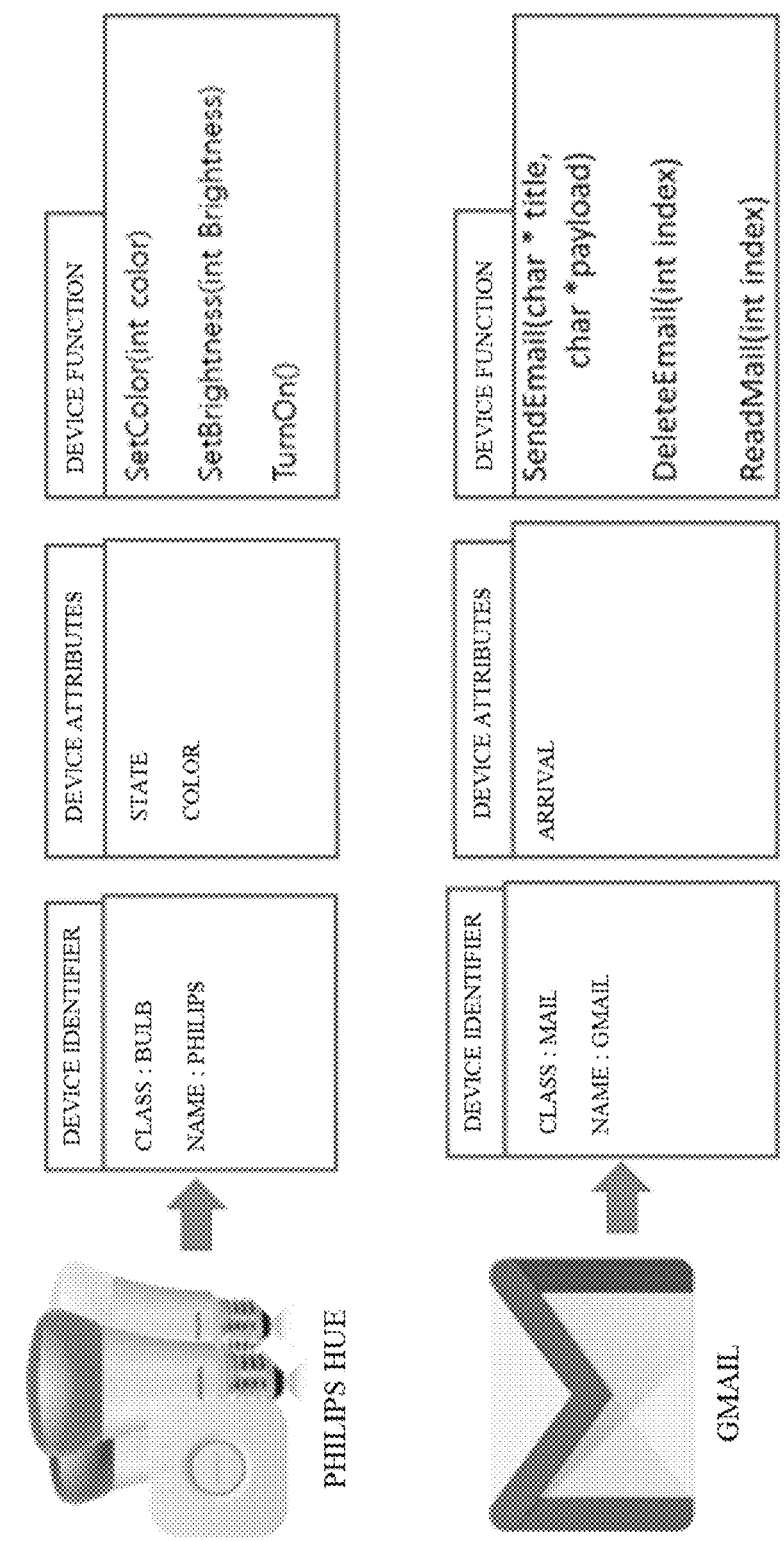
FIG. 18 is a diagram showing an IoT platform and a service device for a method of controlling the IoT platform according to an embodiment of the present invention.

FIG. 17 is a configuration diagram showing an IoT platform and a service device for a method of controlling the IoT platform according to an embodiment of the present invention. FIG. 18 is a diagram showing an IoT platform and a service device for a method of controlling the IoT platform according to an embodiment of the present invention.

The IoT platform and the control method according to this embodiment are substantially the same as the IoT platform control method of FIG. 8 except for a device identifier, device attributes, and a device function. Therefore, the same elements as those of the IoT platform control method of FIG. 8 are designated by the same reference numerals, and a repetitive description thereof will be omitted.

The service device may include a device identifier, device attributes, and a device function.

The device identifier may include the class and name of the IoT device. The device attributes may include the state of the IoT device, the name of a service provided by the IoT device, and the state of a service provided by the IoT device. The device function may include a service provided by the IoT device. For example, it is assumed that a light bulb is abstracted into the service device. The class of the device identifier may be a light bulb, and the name may be a manufacturer. The device attributes may be a power on/off state, a color state, and a contrast state, and the service of the device function may be color adjustment, contrast adjustment, or power control. As another example, it is assumed that an email is abstracted into the service device. The class of the device identifier may be mail, and the name may be G-mail. The device attributes may be whether an email has arrived, and the device function may include sending an email, deleting an email, and reading an email. However, the present invention is not limited thereto, and there is no limitation on the abstracting method as long as what the IoT device provides can be abstracted into a service.

Figure 19:
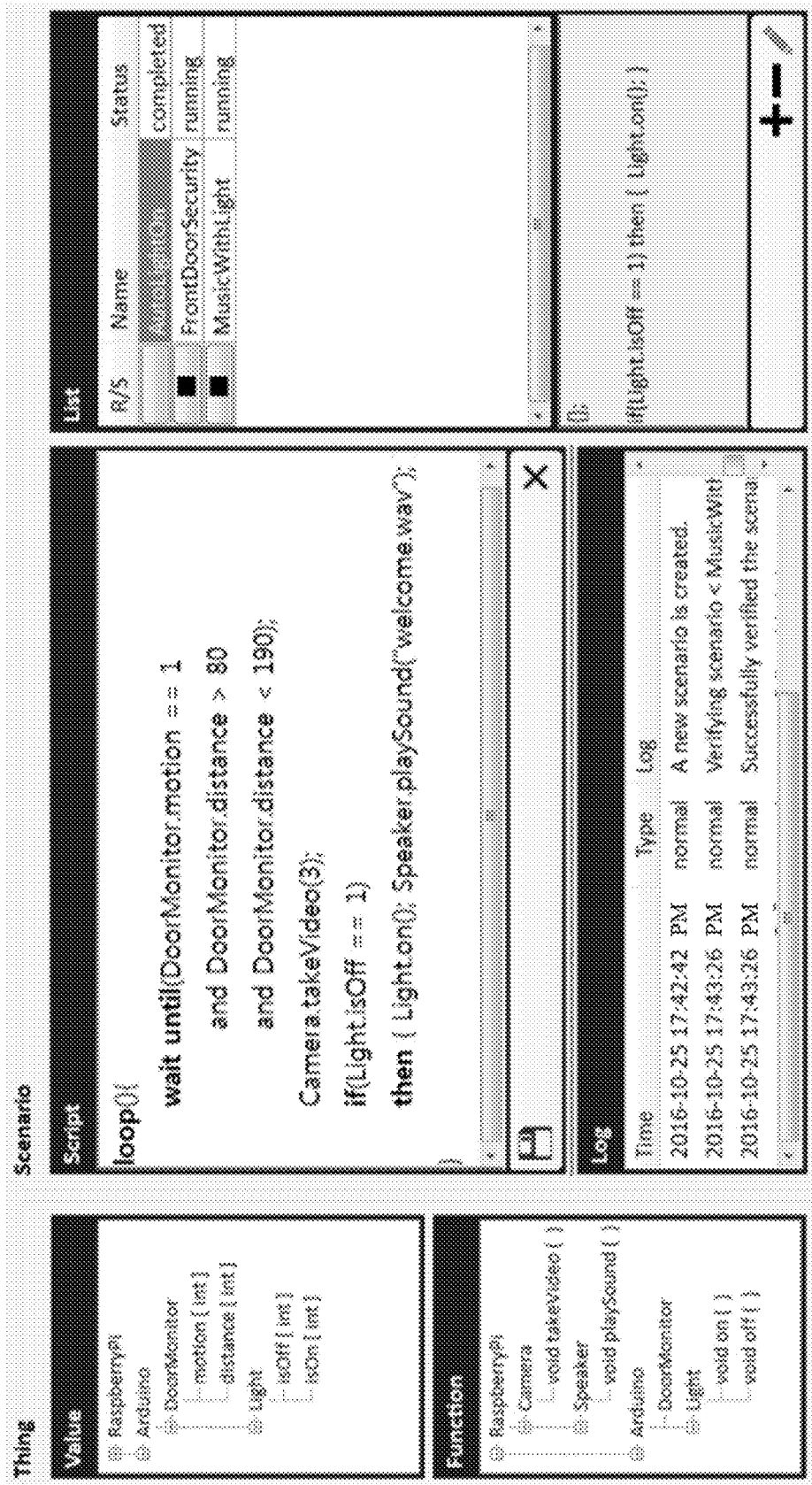
FIG. 19 is a diagram showing an IoT platform and a script editor for a method of controlling the IoT platform according to an embodiment of the present invention.
Figure 21:
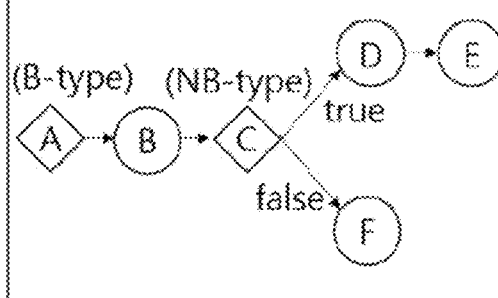
FIG. 21 is a diagram showing an IoT platform, and script code and a service scenario graph for a method of controlling the IoT platform according to an embodiment of the present invention.

FIG. 19 is a diagram showing an IoT platform and a script editor for a method of controlling the IoT platform according to an embodiment of the present invention. FIG. 20 is a diagram showing an IoT platform and a script language for a method of controlling the IoT platform according to an embodiment of the present invention. FIG. 21 is a diagram showing an IoT platform, and script code and a service scenario graph for a method of controlling the IoT platform according to an embodiment of the present invention.

The IoT platform and the control method according to this embodiment are substantially the same as the IoT platform control methods of FIGS. 8 and 9 except for a complex service, a condition node, and an iterative node. Therefore, the same elements as those of the IoT platform control methods of FIGS. 8 and 9 are designated by the same reference numerals, and a repetitive description thereof will be omitted.

The service scenario graph may include a complex service, a condition node, and an iterative node.

The complex service may include a complex service including a finite set of service nodes, a finite set of condition nodes, a finite set of iterative nodes, and a finite set of trunk lines representing execution flows between nodes. The complex service G may be a tuple (S, C, L, E). S may be a finite set of service nodes, C may be a finite set of condition nodes, L may be a finite set of iterative nodes, and E may be a finite set of trunk lines representing execution flows between nodes. In the service scenario graph, a service node s∈S may be a default service that is executed by a device.

The condition node may include a blocking type, a non-blocking type, a true port, and a false port. The condition node c EC may be defined as a tuple (type, true port, false port). The true port and the false port may be output ports for execution according to a result of the condition. The type may be a blocking type (B-type) or a non-blocking type (NB-type). A blocking type node may block the progress of the service graph until a specific condition is satisfied, and a non-blocking type node may allow the progress regardless of whether a specific condition is satisfied. For example, in the script language, "wait until" may be the blocking type, and "if-else" may be the non-blocking type.

The iterative node may include a sub-graph corresponding to a loop, an iterative period of a loop, and a condition for remaining in a loop. The iterative node may be a tuple (SG, iterative period, designated condition). The iterative period may be the iterative period of the loop, and the designated condition may be a condition for remaining in the loop. When the condition is not satisfied, the loop may end. SG may indicate a sub-graph. This may be a graph corresponding to the loop. The iterative period and the designated condition may be omitted. The absence of both the iterative period and the designated condition may indicate an unlimited loop. The presence of only the iterative period may indicate that an unlimited loop is periodically executed, and the presence of only the designated condition may indicate that a loop is executed while the condition is satisfied.

However, the present invention is not limited thereto, and there is no limitation on the method of representing the complex service, the condition node, and the iterative node, the data type, and the data structure type as long as the complex service, the condition node, and the iterative node can be represented. For example, the tuple may be a list.

For example, when a service scenario which is iteratively executed every hour and in which a light bulb is turned on when a house is dark and a motion is captured and in which a camera captures a photo of a moving object and sends the photo by email when a user is more than a certain distance from home is created, script code for combining services using a script language is generated, and the middleware unit may convert a service scenario created using the script code into a service scenario graph, as shown on the left of FIG. 21. In this case, the service scenario graph may be generated as shown on the right of FIG. 21. The service scenario graph may include an iterative node (loop) having one iterative period, four service nodes (B, D, E, F), and two condition nodes (A, C). The two condition nodes may include a blocking-type condition node (A) corresponding to the statement "wait until" and a non-blocking condition node (C) corresponding to the statement "if."

Although the present invention has been described with reference to exemplary embodiments, it will be understood that various changes and modifications may be made herein without departing from the scope and spirit of the present invention defined in the appended claims.

The invention claimed is:

1. An Internet of Things (IoT) platform comprising:
a plurality of middleware units forming a hierarchical structure, each middleware unit comprising:
  a device management unit configured to receive device generation information from an IoT device and establish a connection to the IoT device,
  a service management unit configured to abstract the IoT device into a service device and control the IoT device according to a service scenario, wherein the IoT device is configured to provide a service as the service device, wherein
  the service management unit comprises a service scenario conversion unit configured to convert the service scenario into a service scenario graph and controls the IoT device by mapping the service scenario graph to the IoT device and performing scheduling,
  the service scenario graph comprises:
    a complex service including a finite set of service nodes, a finite set of condition nodes, a finite set of iterative nodes, and a finite set of trunk lines representing execution flows between nodes;
    a condition node including a blocking type, a non-blocking type, a true port, and a false port; and
    an iterative node including a sub-graph corresponding to a loop, an iterative period of a loop, and a condition for remaining in a loop, and
  a data management unit configured to generate and store data regarding the device management unit, the service management unit, and the IoT device; and
a script editor configured to create the service scenario for the service device,
wherein the plurality of middleware units comprise one or more first layer middleware units; and one or more second layer middleware units formed above the first layer middleware units,
wherein each middleware unit operates in connection with an external network or a cloud,
wherein the one or more first layer middleware units is connected to the external network or the cloud through the one or more second layer middleware units so that the one or more first layer middleware units constitute a local network,
wherein the plurality of middleware units interoperate in each layer or between layers, and the data management unit manages the interoperation between the middleware units,
wherein the hierarchical structure of the plurality of middleware units is expandable and an upper layer of the plurality of middleware units controls or manages a lower layer of the plurality of middleware units, wherein upon the IoT device connected to the one or more first layer middleware units, the upper layer configures devices connected to the one or more first layer middleware units different from each other as the complex service.

2. The IoT platform of claim 1, wherein
the device management unit comprises:
  a device connection unit configured to receive device generation information from the IoT device and establish a connection to the IoT device; and
  a device monitoring unit configured to monitor a state of the IoT device, and
the service management unit comprises:
  a service device generation unit configured to abstract the IoT device into the service device;
  a service device control unit configured to control the IoT device according to the service scenario; and
  a runtime service unit configured to manage a runtime for the service device control unit.

3. The IoT platform of claim 1, wherein
the data management unit comprises:
  a state management unit configured to manage a state of each middleware unit;
  a state monitoring unit configured to collect and store state information regarding each middleware unit, the IoT device, the service device, and the service scenario; and
  a state transmission unit configured to transmit the state information to the script editor upon a request from the script editor, and
the script editor comprises a state information display unit configured to receive and display the state information.

4. The IoT platform of claim 1, wherein
the service device is service unit data reconfigured by abstracting a device identifier, device attributes, and a device function provided by the IoT device,
the device identifier includes a class and a name of the IoT device,
the device attributes include a state of the IoT device, a name of a service provided by the IoT device, or a state of a service provided by the IoT device, and
the device function includes non-functional characteristics and functions provided by the IoT device.

5. The IoT platform of claim 1, wherein
the script editor comprises a script code editor installed on an input means selected by a user and configured to support a script language,
script code generated by the user using the script code editor includes one or more services of the service device or one or more different service devices,
the service scenario is created from the script code and is sequentially performed in the written order of the script code, and
the script language includes "if-else," "loop," and "wait until" as control statements.

6. The IoT platform of claim 1, wherein
the device management unit is connected to the IoT device using the Message Queueing Telemetry Transport (MQTT) protocol,
the IoT device comprises:
  a cloud;
  a non-restrictive device that supports the MQTT protocol; and
  a restrictive device that does not support the MQTT protocol,
the service device includes a service provided by a cloud application, and
the IoT platform further comprises a gateway connected to the restrictive device to support the MQTT protocol.

7. The IoT platform of claim 1, comprising a management server connected to each middleware unit and configured to store data regarding the IoT device and a log generated in the IoT platform, wherein
the script editor is installed on an information processing device, a mobile communication device, or an image display device, and
the information processing device, the mobile communication device, or the image display device is connected to each middleware unit in a wired or wireless manner.

8. A method of controlling an Internet of Things (IoT) platform, the method comprising:
interoperating with each other among a plurality of middleware units,
wherein a plurality of middleware units comprise a service management unit having a service scenario conversion unit configured to convert the service scenario into a service scenario graph and controls a IoT device by mapping the service scenario graph to the IoT device and performing scheduling,
the service scenario graph comprises:
a complex service including a finite set of service nodes, a finite set of condition nodes, a finite set of iterative nodes, and a finite set of trunk lines representing execution flows between nodes;
a condition node including a blocking type, a non-blocking type, a true port, and a false port; and
an iterative node including a sub-graph corresponding to a loop, an iterative period of a loop, and a condition for remaining in a loop;
connecting each middleware unit to the IoT device;
abstracting the IoT device into a service device;
generating and storing data regarding the IoT device and the service device;
creating a service scenario for the service device through a script editor; and
controlling the IoT device according to the service scenario,
wherein the IoT device is configured to provide a service as the service device,
the interoperating step comprises:
generating first layer middleware units in which a local network is formed using the plurality of middleware units;
interoperating with second layer middleware units formed above the first layer middleware units; and
managing the interoperation between the plurality of middleware units, wherein the plurality of middleware units interoperates in each layer or between layers,
wherein each middleware unit operates in connection with an external network or a cloud,
wherein the one or more first layer middleware units is connected to the external network or the cloud through the one or more second layer middleware units so that the one or more first layer middleware units constitute a local network,
wherein the plurality of middleware units form a hierarchical structure which is expandable, wherein an upper layer of the plurality of middleware units controls or manages a lower layer of the plurality of middleware units, wherein upon the IoT device connected to the one or more first layer middleware units, the upper layer configures devices connected to the one or more first layer middleware units different from each other as the complex service.

9. The method of claim 8, wherein
the connecting of each middleware unit to an IoT device comprises:
receiving device generation information from the IoT device and establishing a connection to the IoT device; and
monitoring a state of the IoT device, and
the controlling of an IoT device comprises a runtime service step in which a runtime for the controlling of the IoT device is managed.

10. The method of claim 8, further comprising:
a middleware management step in which a state of each middleware unit is managed; and
a state monitoring step in which state information regarding each middleware unit, the IoT device, the service device, and the service scenario is collected and stored,
wherein the monitoring step comprises:
a state transmission step in which the state information is transmitted to the script editor upon a request from the script editor; and
a state information display step in which the state information is received and displayed on the script editor.

11. The method of claim 8, wherein
the service device is service unit data reconfigured by abstracting a device identifier, device attributes, and a device function provided by the IoT device,
the device identifier includes a class and a name of the IoT device,
the device attributes include a state of the IoT device, a name of a service provided by the IoT device, and a state of a service provided by the IoT device, and
the device function includes non-functional characteristics and functions provided by the IoT device.

12. The method of claim 8, wherein
the creating of a service scenario comprises:
allowing the script editor to be installed on an input means selected by a user;
allowing a user to generate script code using a script language in the script editor; and
allowing the service scenario to be generated from the script code,
the script code generated by the user includes one or more services of the service device or one or more different service devices,
the service scenario is sequentially performed in the written order of the script code, and
the script language includes "if-else," "loop," and "wait until" as control statements.

13. The method of claim 8, wherein
the IoT device comprises:
a cloud;
a non-restrictive device that supports the Message Queueing Telemetry Transport (MQTT) protocol; and
a restrictive device that does not support the MQTT protocol,
the service device includes a service provided by a cloud application, and
the method further comprises a gateway connected to the restrictive device to support the MQTT protocol.

14. The method of claim 8, further comprising allowing data regarding the IoT device and a log generated in the IoT platform to be stored in a management server connected to each middleware unit, wherein the script editor is installed on an information processing device, a mobile communication device, or an image display device, and the information processing device, the mobile communication device, or the image display device is connected to each middleware unit in a wired or wireless manner.

* * * * *